US011731357B2

(12) United States Patent
Benson et al.

(10) Patent No.: US 11,731,357 B2
(45) Date of Patent: Aug. 22, 2023

(54) CHAMBER FOR STORING BUILD MATERIAL

(71) Applicant: HEWLETT-PACKARD DEVELOPMENT COMPANY, L.P., Spring, TX (US)

(72) Inventors: Brad Benson, Corvallis, OR (US); Kevin E. Swier, Corvallis, OR (US); James R. Owen, Corvallis, OR (US); Wesley R. Schalk, Vancouver, WA (US)

(73) Assignee: HEWLETT-PACKARD DEVELOPMENT COMPANY, L.P., Redmond, WA (US)

(*) Notice: Subject to any disclaimer, the term of this patent is extended or adjusted under 35 U.S.C. 154(b) by 0 days.

(21) Appl. No.: 16/499,907

(22) PCT Filed: Oct. 5, 2017

(86) PCT No.: PCT/US2017/055269
§ 371 (c)(1),
(2) Date: Oct. 1, 2019

(87) PCT Pub. No.: WO2019/070268
PCT Pub. Date: Apr. 11, 2019

(65) Prior Publication Data
US 2020/0114579 A1 Apr. 16, 2020

(51) Int. Cl.
*B29C 64/255* (2017.01)
*B29C 64/241* (2017.01)
(Continued)

(52) U.S. Cl.
CPC ............ *B29C 64/255* (2017.08); *B22F 12/50* (2021.01); *B29C 49/071* (2022.05);
(Continued)

(58) Field of Classification Search
CPC ............... B29C 64/255; B29C 64/357; G03G 15/0872; G03G 15/0877
See application file for complete search history.

(56) References Cited

U.S. PATENT DOCUMENTS 3,383,020 A  5/1968  Cargile
4,535,693 A  8/1985  Belvederi
(Continued)

FOREIGN PATENT DOCUMENTS

CN  104067180   9/2014
GB  2126654 B   8/1983
(Continued)

OTHER PUBLICATIONS

Hird et al. ("Modelling helical screw piles in clay using a transparent soil", In Proceedings of the 7th International Conference on Physical Modelling in Geotechnics Jun. 17, 2010, pp. 769-774) (Year: 2010).*
(Continued)

*Primary Examiner* — Joseph S Del Sole
*Assistant Examiner* — Ariella Machness
(74) *Attorney, Agent, or Firm* — Shook, Hardy & Bacon L.L.P.

(57) ABSTRACT

Examples of the present disclosure relate to a container. The container has a chamber for storing build material for a three-dimensional printing system. The container comprises an opening coaxial with the chamber for coupling to the three-dimensional printing system. The container is configured such that rotation of the chamber in a first direction conveys build material in the chamber to the three-dimensional printing system and rotation of the chamber in a second direction conveys the build material away from the three-dimensional printing system.

12 Claims, 25 Drawing Sheets

(51) Int. Cl.
*B33Y 40/00* (2020.01)
*B29C 64/321* (2017.01)
*B22F 12/50* (2021.01)
*B29C 49/00* (2006.01)
*B29C 64/259* (2017.01)
*B33Y 10/00* (2015.01)
*B33Y 30/00* (2015.01)
*B29C 64/153* (2017.01)
*B22F 10/28* (2021.01)

(52) U.S. Cl.
CPC .......... *B29C 64/241* (2017.08); *B29C 64/259* (2017.08); *B29C 64/321* (2017.08); *B33Y 40/00* (2014.12); *B22F 10/28* (2021.01); *B29C 64/153* (2017.08); *B33Y 10/00* (2014.12); *B33Y 30/00* (2014.12)

(56) References Cited

U.S. PATENT DOCUMENTS

| | | | |
|---|---|---|---|
| 6,128,453 | A | 10/2000 | Ban et al. |
| 6,389,257 | B1 | 5/2002 | Harumoto et al. |
| 6,951,230 | B1 | 10/2005 | Wegman |
| 7,316,335 | B2 | 1/2008 | Colburn et al. |
| 7,787,806 | B2 | 8/2010 | Sato |
| 7,792,467 | B2 | 9/2010 | Stelter et al. |
| 7,971,991 | B2 | 7/2011 | Davidson et al. |
| 9,156,056 | B2 * | 10/2015 | Abe .................. B22F 12/00 |
| 9,316,946 | B2 | 4/2016 | Ohgoshi |
| 9,482,988 | B2 * | 11/2016 | Hosokawa ......... G03G 15/0877 |
| 9,517,591 | B2 | 12/2016 | Yoo et al. |
| 9,738,035 | B2 | 8/2017 | Tjellesen et al. |
| 9,821,411 | B2 | 11/2017 | Buller et al. |
| 2009/0263146 | A1 * | 10/2009 | Pearce .................. G03G 15/0877 399/27 |
| 2011/0221837 | A1 | 9/2011 | Jones et al. |
| 2013/0186514 | A1 * | 7/2013 | Zhuang ................ B23K 26/702 141/11 |
| 2014/0265049 | A1 | 9/2014 | Burris et al. |
| 2016/0033898 | A1 * | 2/2016 | Yamabe ............. G03G 15/0877 399/258 |
| 2016/0096321 | A1 | 4/2016 | Fry et al. |
| 2017/0139350 | A1 | 5/2017 | Yano et al. |
| 2017/0210069 | A1 | 7/2017 | Stubenruss |
| 2017/0212449 | A1 * | 7/2017 | Kuboki ............ G03G 15/0872 |
| 2018/0099458 | A1 | 4/2018 | Crear et al. |

FOREIGN PATENT DOCUMENTS

| | | | |
|---|---|---|---|
| JP | 2013113946 A1 | 6/2013 | |
| JP | 2013522128 | 6/2013 | |
| JP | 2015116710 | 6/2015 | |
| KR | 10-2016-0107769 A | 9/2016 | |
| RU | 2469851 C2 | 12/2012 | |
| WO | WO2016175746 A1 | 11/2016 | |
| WO | WO-2017075396 | 5/2017 | |
| WO | WO-2017075396 A1 * | 5/2017 | ........... B29C 64/393 |
| WO | WO2017088897 A1 | 6/2017 | |
| WO | 2017/196352 A1 | 11/2017 | |
| WO | 2018/066721 A1 | 4/2018 | |

OTHER PUBLICATIONS

Gonzalez,J.,et al, Remanufacturing the Dell 3110/3115/3130 CN Color Toner Cartridge<http://www.uninetimaging.com/downloads/technical/TecArtWebAdded>.
"Archimedes' screw"—Wikipedia, retrieved at https://en.wikipedia.org/wiki/Archimedes%27_screw, retrieved on Feb. 1, 2022, 7 pages.
Abbas O, H., et al., "Parameters Affecting Screw Pile Capacity Embedded in Soft Clay Overlaying Dense Sandy Soil," IOP Conference Series, Materials Science and Engineering, Mar. 2020, vol. 745, Issue 1, pp. 1-19.

* cited by examiner tainer.
CHAMBER FOR STORING BUILD MATERIAL

BACKGROUND

Certain printing systems make use of a printing material during a printing process. For example, a two-dimensional printing system may use a container to store toner and a three-dimensional printing system may use a container to store a build material. In both cases, the printing material is conveyed from the container to the printing system to allow printing. In a two-dimensional printing system, the toner may be used for image formation on a print medium, such as a sheet of paper. In a three-dimensional printing system, the build material may be used to form a three-dimensional object, such as by fusing particles of build material in layers, whereby the object is generated on a layer-by-layer basis.

BRIEF DESCRIPTION OF THE DRAWINGS

Various example features will be apparent from the detailed description which follows, taken in conjunction with the accompanying drawings, wherein.

DETAILED DESCRIPTION

Figure 1:
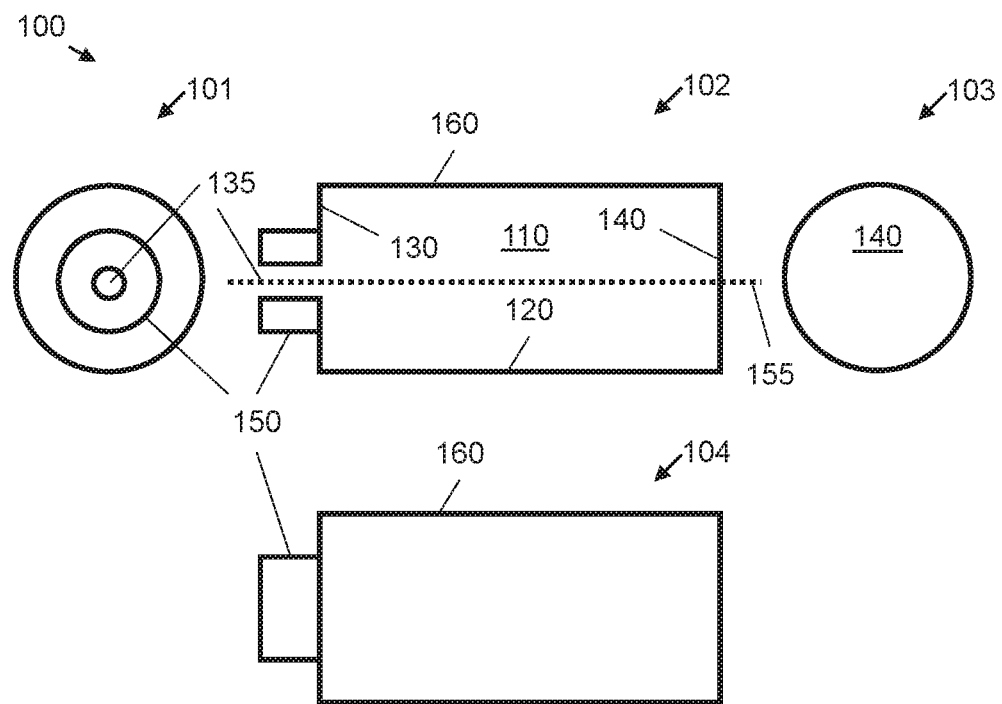
FIG. 1 is a schematic illustration showing a number of views of an example container.

Certain examples described herein relate to a container to store printing material for use in a printing system. Example containers as described herein may be used to supply a printing material to two-dimensional printing systems, e.g. as developer or toner particles, or to supply a build material to three-dimensional printing systems. The printing material may be a powder or powder-like material.

Certain examples described herein provide a rotatable container with components to allow efficient conveyance of printing material to a printing system. By using a rotatable container, space may be more efficiently used within a printing system, for example the container may be horizontally aligned as compared to gravity feed supply systems that may require a long vertical hopper.

Certain examples described herein provide material-conveying and/or material-guiding structures that allow printing material to be dispensed from and/or refilled to a container at a controlled rate. For example, material-conveying and/or material-guiding structures as described herein may enable printing material to be supplied to a printing system from a container at a rate that depends on a rotational speed of the container.

Certain examples described herein provide a container with components to enable rotation in two opposing directions, e.g. clockwise and anti-clockwise. Rotation in a first of the two directions may allow for supply of printing material from the container to the printing system, whereas rotation in a second of the two directions may allow for filling of the container with printing material from the printing system.

For example, certain printing processes may result in an accumulation of used printing material in the printing system. In a three-dimensional printing system this may comprise non-solidified, or unfused, build material that is removed from around a printed three-dimensional object. In a two-dimensional printing system, this may comprise toner that does to contribute to an image that is cleaned from a photoconductive surface during print. It may be useful to remove this excess used material from the printing system in a clean and tidy way. This may be achieved using certain example containers as described herein. In one case, excess printing material may be loaded back into a container by feeding material to a material-conveying member arranged within an opening of the container while the container is rotating in a second "fill" or "intake" direction. If it is desired to increase a rate of excess powder removal, a rate of rotation may be increased. At a predefined rate, rotation cause compaction of the printing material and may thus increase the capacity of the container. If it is desired to remove printing material from the printing system for reuse at a later time, the container can be filled to a normal level by rotating at a slower rate. In other examples, the container may be configured such that rotation in one of the two directions conveys printing material whereas rotation in the other of the two directions does not convey printing material, e.g. the container may be configured to be filled with but not supply printing material.

Certain examples described herein provide a container that may be cheaply and efficiently manufactured. The container allows printing material to be easily delivered to a printing system, and certain components described herein allow for easy storage and handling. To reduce and/or reverse possible effects of consolidation, compaction and segregation during delivery, the container may be rotated in the second "fill" or "intake" direction to re-aerate and re-mix (i.e. "refresh") the printing material. "Mixing" in this sense relates to mixing of the printing material within the container, e.g. either with itself or with air. This enables printing material to be supplied to the printing system with expected and/or original properties and flow behaviors. For example, following shipping and after installation, a container may be quickly "refreshed" via a short rotation in a direction opposite to a direction for supply of the printing material. In certain cases, e.g. during filling of the container, a volume of air may be provided in the container to allow later refresh by tumbling, FIG. 1 shows multiple views of a container for printing material according to an example. The views show schematically certain aspects of an example container to provide a context to the following examples. It should be noted that an actual container configuration may vary in certain aspects from that shown in FIG. 1. For example, shapes of certain aspects and/or relative dimensions may vary according to implementations. A first view 101 shows a top of the container 100. A second view 102 shows a side cross section of the container 100. A third view 103 shows a bottom of the container 100. A fourth view 104 shows an external side of the container 100.

The container of FIG. 1 comprises a hollow chamber 110 formed by an inner wall 120. The chamber 110 has an open end 130 and a closed end 140. The open end 130 has an opening 135 through which printing material may be conveyed to and/or from the chamber 110. The opening 135 is formed within a channel structure 150 that surrounds the opening 135. The channel structure 150 is a portion of the open end 130 in which the opening 135 is formed. The closed end 140 prevents printing material from escaping the chamber 110. The inner wall 120, open end 130, closed end 140 and channel structure 150 may be formed from a single component or may be formed by a number of joined independent components. For example, in one case, the container 100 may comprise a single molded article. In another case, the container 100 may comprise a molded chamber and a molded upper portion that are joined together, e.g. by welding. In yet another case, the container 100 may comprise a molded chamber and separate upper and lower portions that are joined together. In the latter two cases, the channel structure 150 may form part of an upper portion that is joined to a molded chamber.

The container 100 of FIG. 1 has a generally cylindrical form. For example, this may be seen in the first and third views 101, 103, where the container 100 has a circular cross-section. The cross-section of an implementation may vary from a precise circle, e.g. may be generally curved but with projections and indentations. In the second and fourth views 102, 104 it may be seen how, in this example, the container 100 is an elongate cylinder that extends along an axis 155. By way of these features the container 100 is rotatable, e.g. about axis 155. The container 100 may be defined with a diameter D and a length L. In certain implementations, D may be in a range of 150 to 200 mm and L may be in a range of 400 to 500 mm. In other examples the container 100 may be provided in a variety of dimensions. In other examples, the container 100 may comprise a different shape and/or cross-section yet still be rotatable about a central axis. Additionally, as described with reference to certain examples later below, the cross section of the container 100 may not be a perfect circle, but may comprise indentations and/or projections. In FIG. 1, the opening 135 is co-axial with the chamber 110, i.e. the center of the opening 135 and the center of the chamber 110 both lie upon the axis 155.

The container 100 of FIG. 1 also has an outer wall 160. The inner wall 120 and the outer wall 160 are respectively inner and outer surfaces of a side wall of the container 100. In other examples, the inner wall 120 and the outer wall 160 may form separate walls of the container 100, e.g. the container 100 may comprise a gap or cavity between the inner and outer walls 120, 160. The container 100 may be rotated in use. In one case, the container 100 may be mounted within a rotatable mounting, such as a cage or the like. By rotating the cage, the container 100 is rotated. In other cases, the container 100 may be rotated by applying a force to the outer wall 160, e.g. via one or more rollers mounted around the outer wall 160. In one case, one or more of the open end 130 and the closed end 140 may comprise mounting portions for mounting the container 100 within a material supply station.

Figure 2:
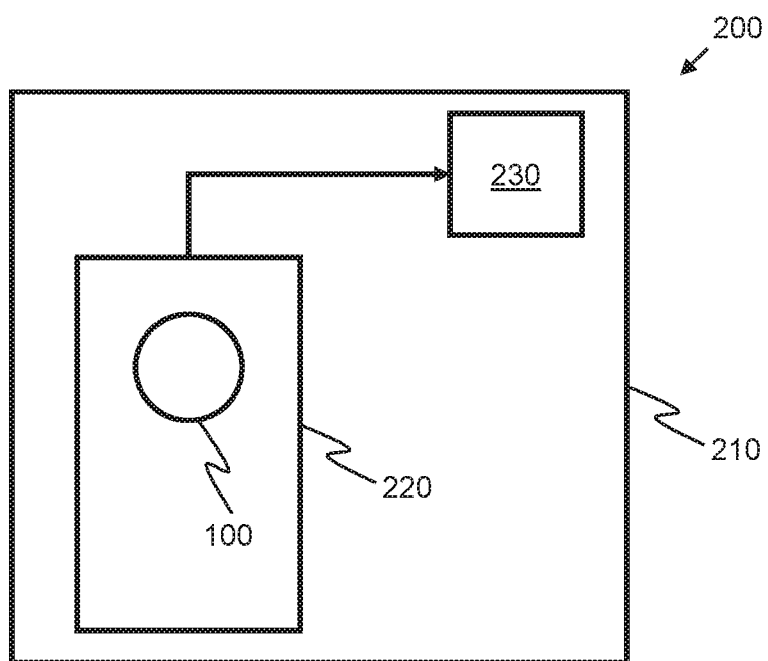
FIG. 2 is a schematic illustration showing a container in use within a printing system according to an example.

FIG. 2 shows a printing system 200 according to an example, wherein the printing system 200 is adapted to use the container 100 of FIG. 1. The printing system 200 comprises a chassis 210 that encloses a material supply station 220 and a printing station 230. In other examples, the material supply station 220 and/or container 100 may be located in a different chassis to the printing station 230. In use, the material supply station 220 supplies printing material to the printing station 230. In certain cases, the printing station 230 may also supply excess or used printing material back to the material supply station 220 (or a separate reuse station having similar functionality). In certain cases, printing material may be supplied from the printing system 200 to the container 100 before it is sent to the printing station 230, e.g. unused printing material may be supplied to the container 100 from internal storage to swap a printing material type, e.g. to change colors or build material type.

If the printing system 200 comprises a two-dimensional printing system, the printing station 230 may comprise an image forming unit including a photoconductor drum, a developer unit and a cleaning unit. The developer unit may deposit toner material supplied from the material supply station 220 onto the photoconductive drum following charging and image exposure, i.e. "develop a toner image". The toner image may be transferred to a print medium, such as paper, to form a printed output. Excess toner may be removed from the photoconductor drum by the cleaning unit.

If the printing system 200 comprises a three-dimensional printing system, the printing station 230 may comprise a material feed unit, a platen and a selective solidification unit. The material feed unit may receive build material from the material supply station 220 to create layers of build material upon the platen. The solidification unit may then act to selectively solidify portions of each layer of build material. The platen may be moved vertically to enable successive layers of build material to be formed. By repeating this process three-dimensional objects of almost any shape may be generated from a digital three-dimensional model.

If the printing system 200 comprises a three-dimensional printing system, the printing station 230 may implement an additive manufacturing process. In these processes, three-dimensional objects are generated on a layer-by-layer basis under computer control. The printing station 230 may implement one or more of additive manufacturing technologies to form a three-dimensional object from supplied powdered build material. Such techniques include, for example, selectively melting semi-crystalline thermoplastic powdered build materials, and/or selective electron-beam melting of metal powder build material.

In some three-dimensional printing system examples, solidification of a build material is enabled using a liquid binding agent, such as an adhesive. This liquid agent may be applied using a moveable print head located above the platen referenced above. In certain examples, solidification may be enabled by temporary application of energy to the build material, for example using a focused laser beam. In certain examples, liquid fusing agents are applied to build material, wherein a fusing agent is a material that, when a suitable amount of energy is applied to a combination of build material and fuse agent, causes the build material to heat up, to melt, fuse and solidify. Other agents may also be used, e.g. agents that inhibit or modify a level of fusing when selectively deposited in certain areas. Fusing of build material may be performed using thermal or non-thermal methods. Non-thermal fusing techniques may include techniques such as binder jetting. A liquid agent may be applied using a thermal or piezoelectric printhead.

The printing system 200 may receive a definition of an image or object to be printed in digital form. In a two-dimensional case, the image may be decomposed into multiple color separations for printing. In this case, the material supply station 220 may comprise toner of different colors from different containers 100. There may be a common material supply station or different material supply stations for each color. In a three-dimensional case, a digital representation may be virtually sliced into slices by computer software or may be provided in pre-sliced format. Each slice represents a cross-section of the desired object.

In the example of FIG. 2, the container 100 is mounted horizontally, i.e. wherein the axis 155 is substantially perpendicular to a gravitational axis (e.g. the vertical). In other cases, the container 100 may be mounted at an angle to the horizontal, e.g. at an angle of up to 20-30 degrees. To supply printing material to the printing station 230, the material supply station 220 is arranged to rotate the container 100. This is explained in more detail with regard to FIGS. 3, 4 and 5 below.

Figure 3:
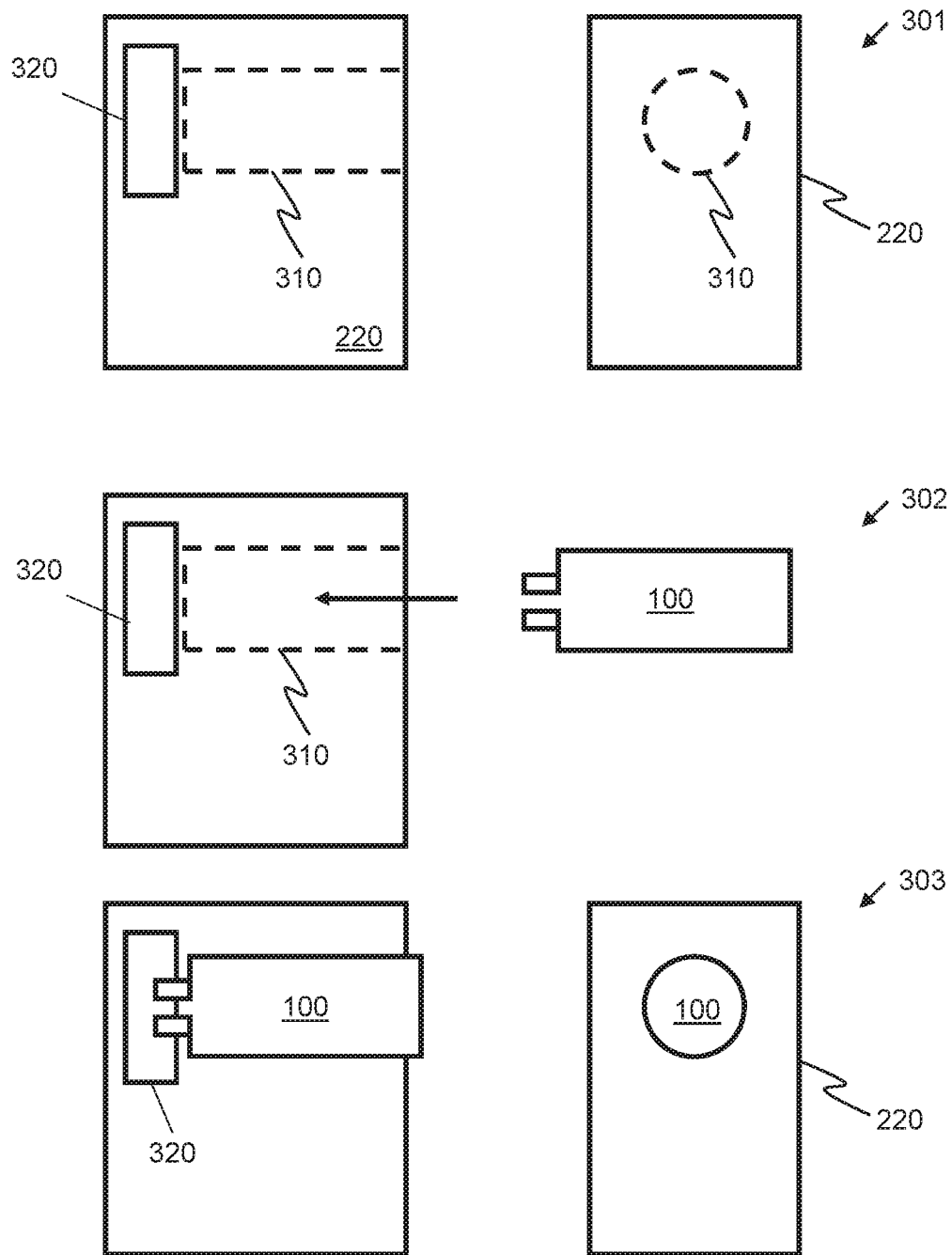
FIG. 3 is a schematic illustration showing a number of stages that are involved when inserting a container into a supply station.

FIG. 3 shows schematically a number of stages in a process of coupling a container 100 to a material supply station 220. A first stage 301 shows a first point in time where a container is not mounted within the material supply station 220. A second stage 302 shows a second point in time where a container is inserted into the material supply station 220. A third stage 303 shows a third point in time where a container 100 is present within the material supply station 220. For each stage, a schematic side cross section of the material supply station 220 is shown. Certain features of the container 100 and the material supply station 220 have been omitted in each stage to clearly show the process of insertion. For the first and third stages 301, 303, a front view of the material supply station 220 is also shown on the right hand side. Views 302 and 303 show a schematic cross section of the container 100.

In the example of FIG. 3, the material supply station 220 comprises a mounting, or receiving interface, 310 and an intake 320. The intake 320 may be seen as a component of the printing system that couples to the container 100. The mounting 310 comprises an elongate passageway or cage that is configured to receive the container 100. The mounting 310 may comprise closed and/or open sections, e.g. may comprise an elongate tube with a continuous inner surface and/or discrete supporting members located around a volume of space where the container 100 is to be located (e.g. as per a cage). In one case, the mounting 310 may comprise a guide surface along which a corresponding outer surface of the container 100 (e.g. at least a portion of outer wall 160) may be guided during insertion. This guide surface may be located at a base of the mounting 310. In certain examples, the mounting 310 may comprise retractable members, wherein the members are retracted during insertion of a container and are extended to grip a container when the container is in place. The mounting 310 may be configured to fully receive the container 100 within the material supply station 220 and/or chassis 210, or may be configured such that an end of the container 100 projects out from the material supply station 220 and/or chassis 210. Although not shown, the material supply station 220 and/or chassis 210 may comprise a door that is opened to reveal the mounting 310 and that is closed during normal operation (e.g. with or without an inserted container 100). In one case, the mounting 310 may be rotated to rotate the container 100, e.g. if the mounting comprises a cage that receives the container 100 the cage may be rotated to rotate the container 100.

The intake 320 as shown in FIG. 3 comprises one or more components to receive the channel structure 150 of the container 100 and thus to allow printing material to be supplied to or extracted from the container via the opening 135. The intake 320 may comprise one or more bearings, e.g. in an annular member that receives the channel structure 160. The intake 320 may also comprise a mechanical coupling that attaches to the container 100 to retain the container 100 in place. The mechanical coupling may attach to the channel structure 150 and/or outer wall 160, and/or a component of the container 100 as described in more detail later below.

The second stage 302 shows that the container 100 is aligned horizontally with the mounting 310, with the opening 135 facing the intake 320. The container 100 is then pushed into the mounting 310 from the front of the material supply station 220. The container 100 may be inserted by applying a force to the closed end 140 of the container 100. The container 100 may be inserted manually, via a robot actuator and/or via a container transport system. The container 100 is inserted until the open end 130 of the container 100 reaches the intake 320. At this point, the channel structure 150 may form a sealed coupling with the intake 320. This is shown in the third stage 303.

The third stage 303 shows the container 100 in place within the mounting 310. The channel structure 150 is accommodated within the intake 320. In one example, the intake 320 may be configured to unseal the container 100, e.g. via translation of a valve structure as described in more detail below. Once the container 100 is in place printing material may be extracted from the container 100, and/or printing material may be supplied to the container 100, through the opening 135 and the intake 320. For example, the intake 320 may be coupled to a feed system that provides printing material to the printing station 230. This process may be direct or indirect, e.g. printing material may be directly conveyed to and/or from the printing station 230, or may be conveyed to and/or from intermediate storage components within the printing system 200. The feed system may comprise one or more tubes, filters, pumps, blowers, separators and/or hoppers. The feed system may apply a pressure differential to facilitate powder extraction and/or to transport printing material within the printing system.

FIG. 3 shows one example method of coupling a container 100 to a material supply station 220. Other methods and structures are possible. For example: the container 100 may be installed at an angle to the horizontal or vertically; the material supply station 220 may provide an opening from above, a side or below instead of at the front; and/or the container 100 may be rolled or slid into place.

Figure 4:
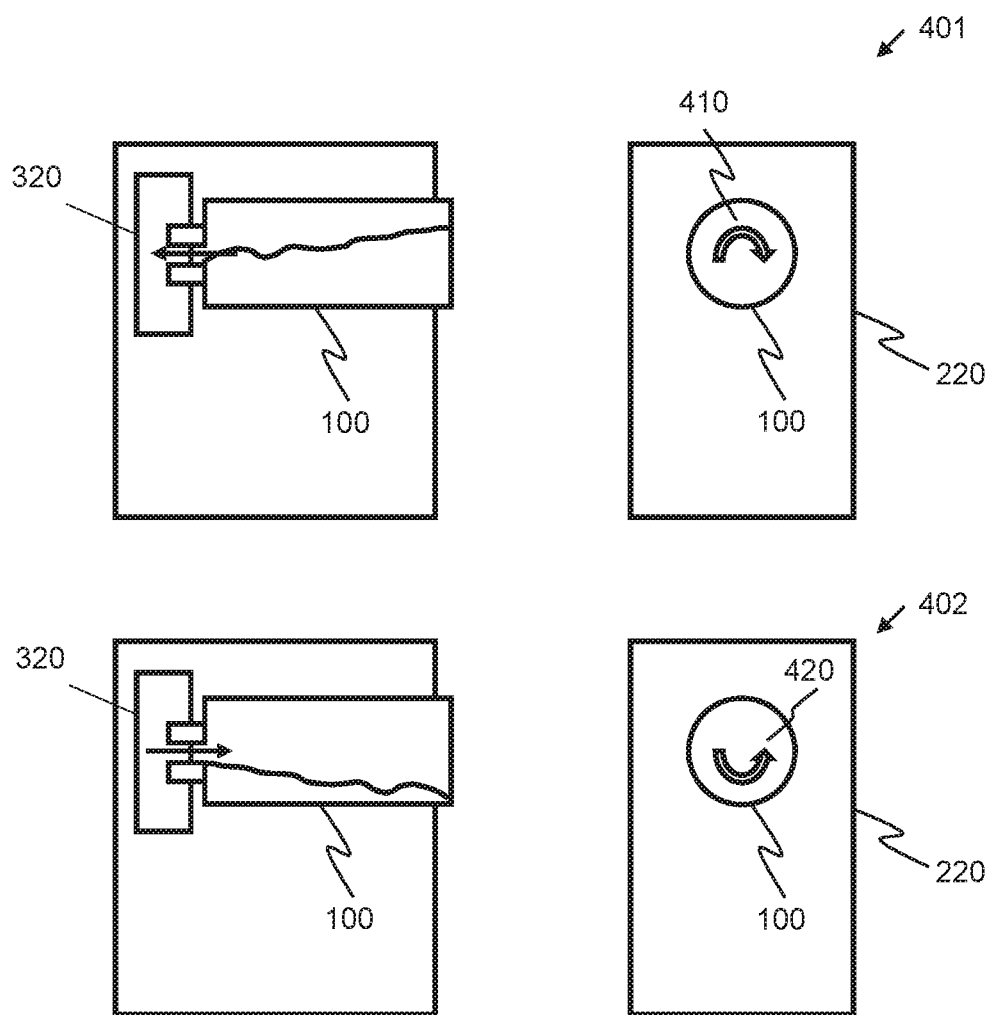
FIG. 4 is a schematic illustration showing rotation of a container in two opposing directions according to an example.

FIG. 4 shows how printing material may be conveyed to and/or from an installed container 100 via rotation of the container 100. In this example, the container 100 is configured such that rotation of the container 100 in a first direction conveys the printing material to the intake 320 and rotation of the rotatable chamber in a second direction conveys the printing material away from the intake 320. In particular, by rotating the rotatable chamber 110 of the container 100, printing material may be supplied to and/or from the printing system 200 so as to respectively deplete and/or at least partially fill the volume of the chamber 110.

In a first stage 401 in FIG. 4, the container 100 is rotated in a first direction 410. The rotation may be applied by the material supply station 220 or by an external agent. In the former case, a cage that holds the container 100 may be rotated. Alternatively, in other examples, rollers positioned around the container 100 may apply a force to the outer wall 160 to rotate the container 100 within the mounting 310. In the latter case, a handle or grip may be provided at the closed end 140 of the container 100 to allow the container 100 to be rotated by a human or robot agent. In the first stage of FIG. 4, rotation is clockwise. However, depending on the container implementation, the direction may be counter-clockwise in other examples. The left hand side view of the first stage 401 shows printing material being supplied to the material supply station 220 from the container 100 during the rotation. Printing material may then be distributed to other components of the printing system 200 from the material supply station 220. In the first stage 401, printing material is depleted within the container 100 during rotation.

In a second stage 402 in FIG. 4, the container 100 is rotated in a second direction 420. Again, the rotation may be applied by the material supply station 220 or by an external agent. In the second stage of FIG. 4, rotation is counter-clockwise (or anti-clockwise). However, depending on the container implementation, the direction may be clockwise in other examples (i.e. the directions of the first and second stage may be reversed). The left hand side view of the second stage 402 shows printing material being supplied from the material supply station 220 to the container 100 during the rotation. In the second stage 402, the container 100 is filled with printing material.

In certain cases, the container 100 may be configured such that each complete rotation of the cylinder in the first direction conveys a predefined quantity of printing material to the material supply station 220. For example, this may be achieved by providing and configuring a material-conveying member and/or a material-guiding structure as described in more detail later below.

Figure 5:
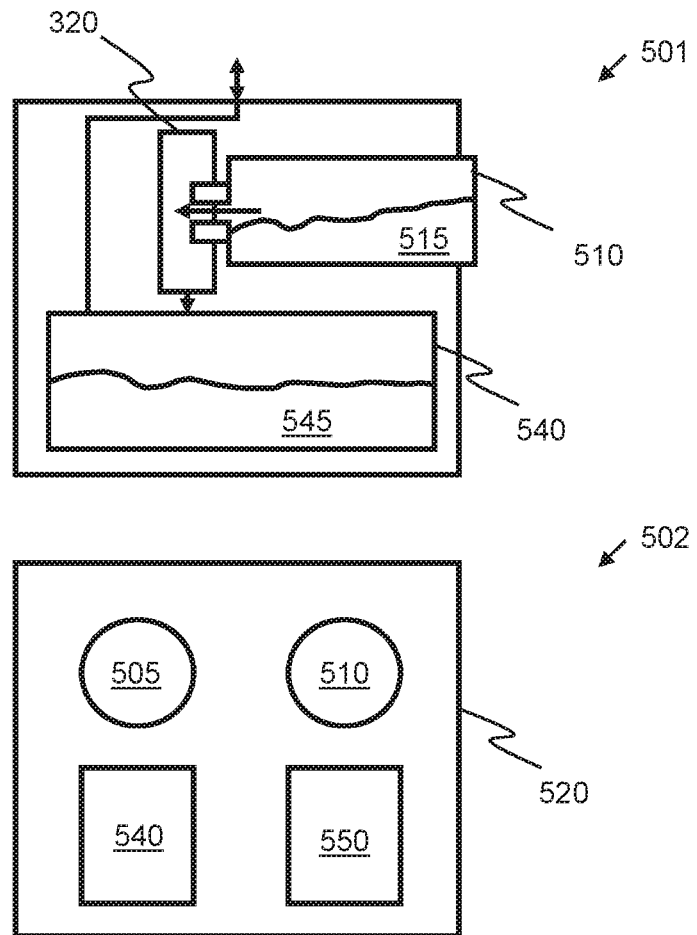
FIG. 5 is a schematic illustration showing views of an example supply station comprising hoppers.

FIG. 5 shows a variation of the example of FIGS. 3 and 4. Two views are shown: a schematic side cross section 501 and a schematic front cross section 502. In this variation two containers 505 and 510 are mountable within a print supply station 520 (based on material supply station 220). For example, the first container 505 may provide unused or "virgin" powdered material and the second container 510 may be used to collect or provide used powdered material. For example, in certain cases the second container 510 may provide used printing material if sufficient used printing material cannot be provided by the printing system itself (e.g. due to a print run just starting or the size or quality of objects that are being produced). Used printing material may also be supplied while switching from one printing material to another. As such, during a printing process, printing material 515 may be supplied to a printing station such as 220 by rotating the first container 505 in a first direction and used printing material resulting from the printing process may be supplied to the second container 510 by rotating the second container 510 in a second direction. It will be understood that this approach may be extended to more than two containers and that the directions, and supply/fill configuration, may vary according to the implementation.

FIG. 5 also shows the use of two intermediate hoppers 540, 550 for printing material. These may be used as buffers within the printing system 200. For example, a first intermediate hopper 540 may receive printing material 545 from the first container 505. The printing material 545 may then be supplied to the printing station 230 from the first intermediate hopper 540. The second intermediate hopper 550 may receive printing material from the printing station 230. This printing material may be temporarily stored before being used to fill the second container 510 and/or to generate print output. Each intermediate hopper 540, 550 may be coupled to a corresponding intake within the material supply station 520, for example by a feed system comprising components as referenced above.

Figure 6:
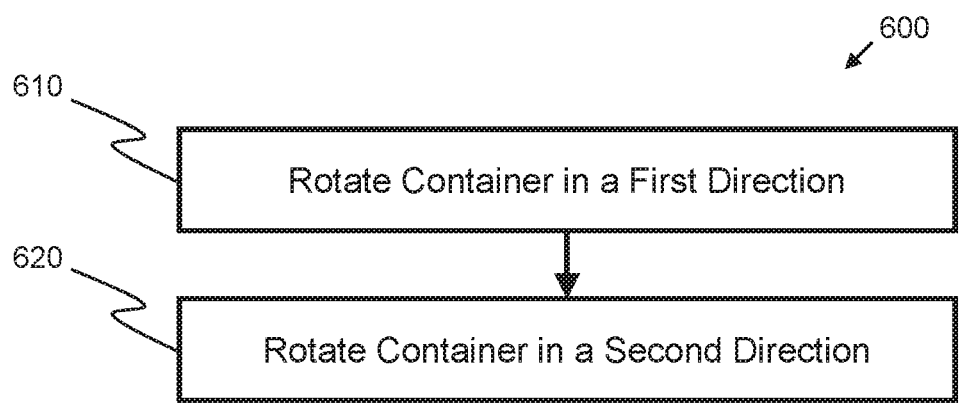
FIG. 6 is a flow chart showing a method for conveying printing material according to an example.

FIG. 6 shows an example method 600 for conveying printing material to or from a container, e.g. to or from a component of a printing system. For example, this method may be applied to printing system 200 or another different printing system. The component of the printing system may comprise a material supply station such as material supply station 220, 520 or the like. At block 610, a container (such as container 100) is rotated in a first direction to convey printing material from an interior of the container, e.g. towards the component of the three-dimensional printing system relative to the interior of the container. For example, this is shown in the first stage 401 of FIG. 4. At block 620, the container is rotated in a second direction to convey printing material into the interior of the container, e.g. away from the component of the printing system relative to the interior of the container. For example, this is shown in the second stage 402 of FIG. 4. The first and second directions may be clockwise and counter-clockwise or vice versa. Rotation in either direction may be applied independently in certain examples, e.g. a container may be emptied but not refilled or filled but not emptied. For example, empty containers or container that are filled with used printing material may be recycled.

In one case, a complete rotation of the cylinder in the first direction conveys a predefined quantity of printing material to the printing system. This may be referred to as a "dose" of printing material. This may be achieved when the container contains at least a predefined quantity of printing material. As described elsewhere the printing material may comprise a powder, e.g. be a powdered material.

In one case, block 610 may be performed for a predetermined time interval to supply a predefined quantity of printing material to the printing system. This may be provided directly to a printing station or stored temporarily in an intermediate hopper. In this case, rotating the container in the second direction may be performed at one or more intervals during rotation of the container in the first direction to mix the printing material during supply of the printing material to the printing system. In this case, "mixing" is performed in relation to the printing material within the container, as opposed to a mixing of different printing materials. This may be seen as "self" mixing, e.g. changing a configuration of material particles, and/or mixing with air within the container. For example, a first quantity of printing material may be supplied by rotating the container in the first direction. Once the first quantity has been supplied, rotation of the container in the first direction may cease, and rotation of the container in the second direction may be started to mix or "refresh" the printing material in the container. The rotation in the second direction may be performed for a different length of time as compared to the rotation in the first direction. For example, the rotation in the second direction may be performed for a shorter time period. The rotation in the second direction may also be performed at a different rate of rotation to the rotation in the first direction. For example, the rotation in the second direction may be faster. For a container with a diameter of between 150 and 200 mm and a length of between 400 and 500 mm, a rate of rotation may be up to 2 Hz. The container may then be again rotated in the first direction to deliver newly refreshed printing material to the channel structure, and thus to the printing system via an intake, at a rate that depends on the rotational speed. In one case, the container may be rotated in the second direction when the container is first installed, i.e. before rotation in the first direction. This may enable printing material to be "refreshed" following shipping, storage and handling.

Rotation in the second direction may also be performed after an image or object has been printed, e.g. to supply unused printing material back into the container. For supply of printing material to the container, a rate of the rotation in the second direction may be configured to provide a flow rate of 5 g/s into the container.

In the above case, rotating the container in the second direction may comprise rotating the container at a predefined rate to compact a powdered printing material within the container during filling of the container. For the example dimensions above, a predefined rate greater or equal to 2 Hz generates centrifuging motion that compacts printing material within the container. This rate may be applied for around 10 minutes to provide compaction. Compaction may be controlled by controlling a rate of rotation and a time of rotation. For example, a smaller centrifugal force applied for a longer time may have an equivalent effect to a larger centrifugal force applied for a shorter time. Compaction of printing material may increase a capacity of the container, i.e. reduce the volume of a given quantity of powdered material within the container to allow more powder to be stored as compared to an uncompacted case. Compaction may not be desired if the printing material is to be supplied again from the container (e.g. via rotation in the first direction). In certain cases, compaction may be reversed by varying the rotation parameters. In the present example, rotation at 1.2 Hz provides cascading motion of printing material within the container and rotation at 1.5 Hz provides cataracting motion. These forms of motion may reverse the effects of compaction by mixing the printing material.

In one case, the component of the printing system comprises a material supply system and the method comprises, prior to rotating the container in the first direction: inserting the container into the material supply system; and coupling an opening of the container to an intake of the material supply system. This, for example, is shown in FIG. 3. As shown in this Figure, the container may be aligned horizontally within the material supply system. In one case, coupling the opening of the container to the intake of the material supply system comprises translating a valve structure within the opening to unseal the container. This may also be performed independently of any coupling to unseal the container. The valve structure may be an auger valve. This is described in more detail in later examples.

Example properties of the printing material will now be briefly discussed. The printing material may be a dry, or substantially dry, powder or powder-like material. In other examples, the printing material may comprise a liquid-type build material such as a viscous liquid, paste, or gel. In a three-dimensional printing example, a printing material may have an average volume-based cross-sectional particle diameter size of between any one of the following: approximately 5 and approximately 400 microns, between approximately 10 and approximately 200 microns, between approximately 15 and approximately 120 microns or between approximately 20 and approximately 70 microns. Other examples of suitable, average volume-based particle diameter ranges include approximately 5 to approximately 70 microns, or approximately 5 to approximately 35 microns. A volume-based particle size is the size of a sphere that has the same volume as the printing particle. With "average" it is intended to explain that most of the volume-based particle sizes in the container are of the mentioned size or size range but that the container may also contain particles of diameters outside of the mentioned range. For example, the particle sizes may be chosen to facilitate distributing printing material layers having thicknesses of between approximately 10 and approximately 500 microns, or between approximately 10 and approximately 200 microns, or between approximately 15 and approximately 150 microns. One example of an additive manufacturing system may be pre-set to form powdered material layers of approximately 80 microns using build material containers that contain powder having average volume-based particle diameters of between approximately 40 and approximately 60 microns. An additive manufacturing apparatus may also be configured or controlled to form powder layers having different layer thicknesses.

In a three-dimensional printing (i.e. additive manufacturing) case, a printing material for use in example containers described herein may include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example, glass particles, and/or a combination of at least two of these or other materials, wherein such combination may include different particles each of different materials, or different materials in a single compound particle. Examples of blended build materials include alumide, which may include a blend of aluminum and polyamide, multi-color powder, and plastics/ceramics blends. Blended build material may comprise two or more different respective average particle sizes. Printing material as used herein also covers build materials comprising fibers. These fibers may for example be formed by cutting extruded fibers into short lengths. For example, a fibre length may be selected to allow effective spreading of the build material onto a platen or build platform. For example, the length may be approximately equal to the diameter of the fibers.

Keeping with a three-dimensional printing example, a brief further explanation of the notion of "unused" and "used" printing material will now be provided. For example, containers as described herein may be initially filled with unused printing material for supply to a printing system and/or may be filled with used printing material arising from a printing process of the printing system.

A particular batch of printing material for use in an additive manufacturing process may be fresh (e.g. "unused") build material or "used" build material. Fresh build material should be considered to be build material which has not previously been used in a three-dimensional printing build job. For example, this may comprise build material that has not been heated during a thermal process and/or build material that has not received a chemical binder in a non-thermal process. An unopened supply of build material as supplied by a build material manufacturer may therefore contain fresh build material. By contrast, used build material is build material which has previously been supplied to a three-dimensional printing system for use in an additive manufacturing process but which has not been solidified during the process. For example, the used build material may be produced during a thermal-fusing, three-dimensional printing operation, in which powder build material is heated to close to its melting temperature for a period of time which may be sufficient to cause material degradation of the powder. In this respect, it will be understood that not all of the build material supplied to a three-dimensional printing system for use in an additive manufacturing process may be used and/or incorporated into a three-dimensional printed article. At least some of the non-solidified build material recovered during or after completion of a three-dimensional print job may be suitable for reuse in a subsequent additive manufacturing process. Such build material may be stored, for example in the containers described herein, for subsequent use, and may be designated as 'used' build material.

Continuing the above example, the used build material may also be mixed with fresh build material for subsequent printing processes. In the example of FIG. 5, the first container 505 may comprise fresh build material that is mixed with used build material present within the second container 510. The mixing proportion may be variable, for example based on powder properties. Mixing may be performed externally or internally, with reference to the containers. For example, mixing may be performed using (or within) a feed system and/or one or more intermediate hoppers, or used build material may be supplied to the container for a first period and virgin build material supplied to the container for a second period. In one case, an internal hopper may have at least twice the capacity of a container. In one case, mixing may be performed during use within a feed system based on pneumatic conveyancing, e.g. on printing material extracted from the containers and/or internal hoppers. The container may then be further rotated to mix the combination within the container. In one example, a mix of 80% used and 20% fresh build material may be used for objects for some applications, with 100% fresh build material being used for objects for other applications.

In general, printing material containers may be used to supply recycled or reconditioned (e.g. used but unsolidified in a three-dimensional case) printing material in addition to, or instead of, fresh printing material. In certain cases, printing material of varying qualities may be supplied, e.g. different printing material containers may supply different grades of printing material that each adhere to different quality specifications. In some examples, used printing material may be returned to a supplier.

Aspects of a rotatable container for storing a printing material for a printing system, in particular relating to a channel and/or valve structure for such a container, will now be described with reference to FIGS. 7A to 7E. These aspects relate to a material-conveying member that may be located within an opening of the container, e.g. opening 135 as shown in FIG. 1.

Figure 7A:
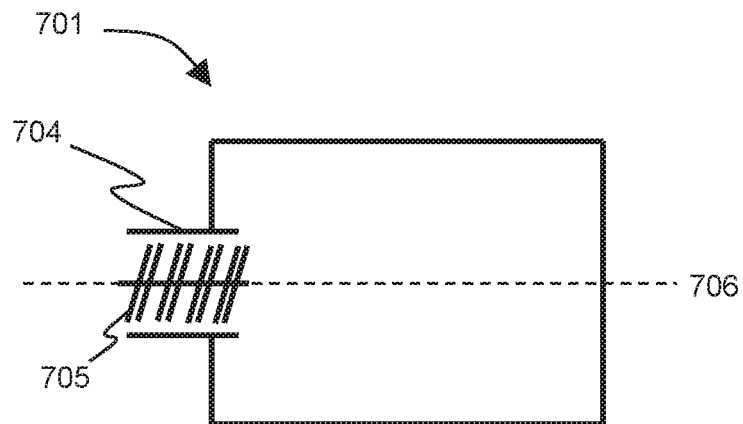
FIGS. 7A to 7E are schematic diagrams showing example aspects of a channel structure and a valve structure for a container.

FIG. 7A shows schematically a rotatable container 701 for storing a printing material for a printing system. The container 701 may be based on container 100 shown in FIG. 1. The container 701 comprises a channel structure 704 for conveying the printing material, the channel structure defining an opening of the container 701. The channel structure 704 may be based on channel structure 150 as described above. The channel structure 704 may be for conveying the printing material from the container 701 into the printing system during, or prior to, a printing operation. The channel structure 704 may also be for conveying the printing material from the printing system into the container 701, during a filling or refilling operation.

The container 701 comprises a material-conveying member 705 at least partially disposed within the channel structure 704. The material-conveying member 705 is arranged to convey printing material through the channel structure 704, e.g. either into or out of the container 701. In this example, the material-conveying member is a helix screw, however other configurations are possible. The helix screw may, for example, be a multi-helix screw such as a double helix screw. The material-conveying member 705 is mounted to prevent rotation relative to the channel structure 704. As such, rotation of the container 701 and its chamber also leads to rotation of the material-conveying member 705. For example, a notch in one of the material-conveying member 705 and channel structure 704 may interface with a protrusion of the other of the channel structure 704 and the material-conveying member 705, whereby to prevent relative rotation. Alternatively or additionally, relative motion may be prevented by way of connecting means, for example an adhesive and/or a connecting member such as a bracket or screw, by which the material-conveying member 705 and channel structure 704 are joined. In some examples, the entire container 701 is configured to rotate together, such that there is no relative motion between the material-conveying member 705, the channel structure 704 and the remainder of the container 701. For example, the container 701 may comprise helical raised portions to direct printing material to the channel structure 704, or away from the channel structure 704, depending on rotation direction as described elsewhere herein.

The channel structure 704 and the material-conveying member 705 are arranged to rotate together about a shared axis 706 to convey the printing material through the channel structure. This may comprise the axis 155 shown in FIG. 1. For example, the material-conveying member 705 and the channel structure 704 may be arranged to rotate in a first direction to convey printing material into the container 701, and to rotate in a second direction, opposed to the first direction, to convey printing material out of the container 701.

In certain cases, the use of a multi-helix screw as the material-conveying member 705 allows printing material to be collected by the screw at more than one point over the course of a single rotation. For example, a double helix screw collects printing material at twice as many points during a rotation compared with a single helix screw. The efficiency and speed of material conveyance is thereby improved.

In some examples, printing material is supplied to the material-conveying member 705 from above or from the side. For example, during a refilling operation, recycled printing material may be fed to the material-conveying member 705 by gravity from a nozzle located above the material-conveying member 705. In certain examples, the use of a multi-helix screw allows printing material to be collected at any point in the rotation cycle. A single helix screw would not collect printing material when the end of the screw thread is pointed away from the nozzle. This may cause the printing material to fall through the screw, from where it could be collected and returned to the nozzle. The use of a multi-helix screw thus improves the efficiency of printing material supply, in particular in a refilling operation, as this reduces or avoids such collection and returning.

Figure 7B:
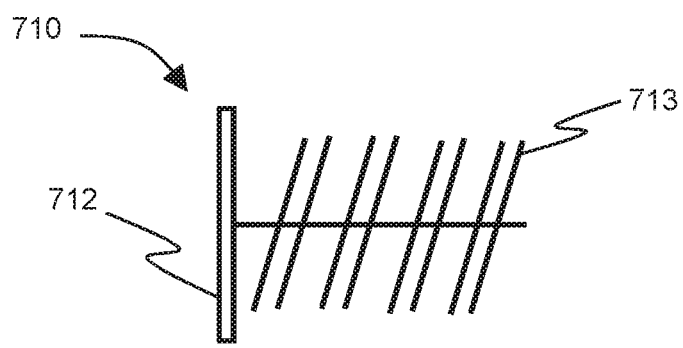
Figure 7C:
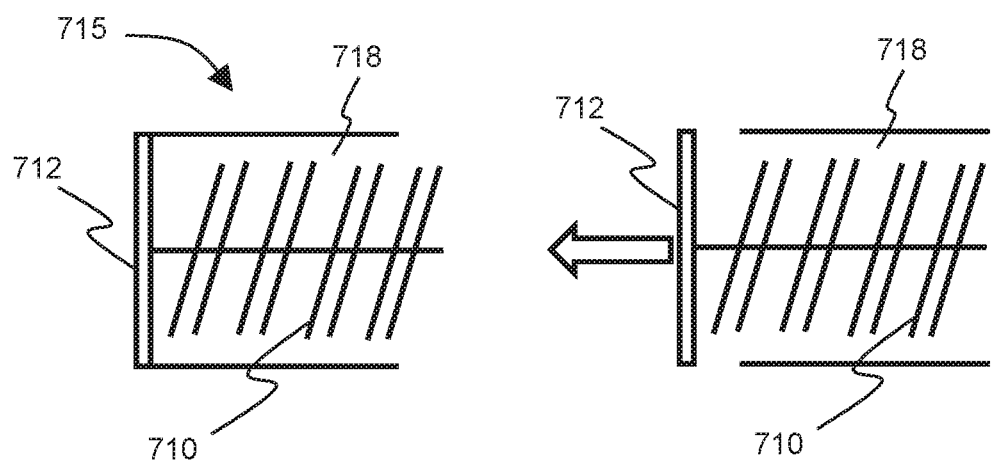

FIG. 7B shows schematically a valve structure 710 for a printing material container, for example to be located within a channel structure of the container as described above.

The valve structure 710 comprises a seal 712 arranged circumferentially about an axis of the valve structure. For example, the seal may comprise a compressible member such as a rubber O-ring.

The valve structure 710 comprises a material-conveying member 713 aligned with an axis of the valve structure, for example configured as described above in relation to FIG. 7A. The material-conveying member 713 may be a double helix screw.

The seal 712 is arranged at a distal end of the material-conveying member 713, i.e. an end that in use is furthest from the interior of the container. The material-conveying member 713 comprises a structure to prevent rotation relative to the opening of the printing material container. For example, the structure may comprise a notch or a connecting means as described above.

The valve structure 710 is configured to be translatable within an opening of the printing material container, for example a channel structure as described above in relation to FIG. 7A.

An example of such a translation is shown schematically in FIG. 7O. In the left-hand image 715, the valve structure 710 is positioned within the opening 718 of the printing material container such that the seal 712 seals the opening 718. In the right-hand image 720, the valve structure 710 is translated leftwards, such that the seal 712 does not seal the opening 718.

Figure 7D:
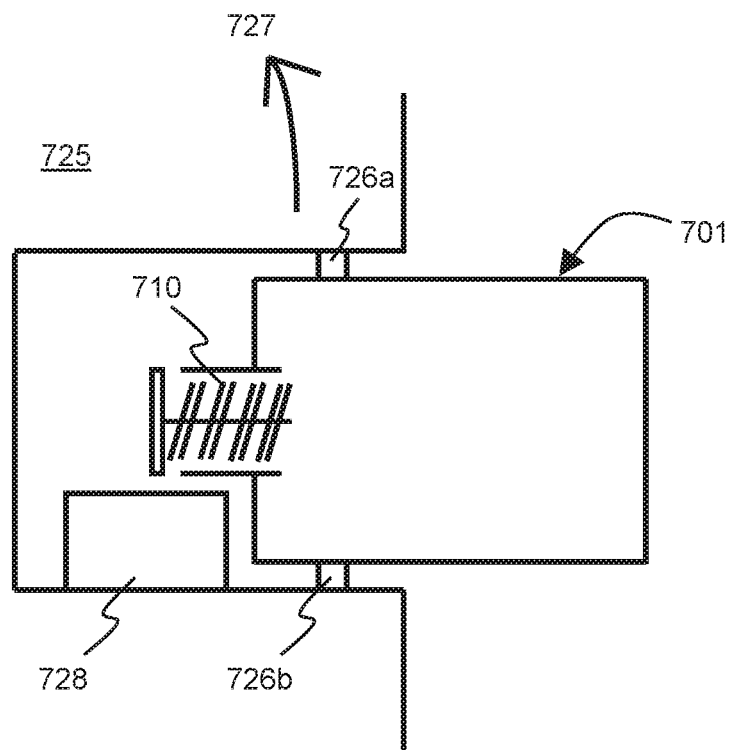

FIG. 7D shows schematically a container 701 comprising a valve 710 as described above, mounted within a printing system 725. For example, the printing system 725 may comprise printing system 200 and the container 701 may be mounted within a material supply station such as material supply station 220 or 520 in FIGS. 3 to 5. The container 701 is held in place by retaining members 726a, 726b of the printing system 725. For example, the retaining member may comprise sprung brackets or latches to hold the container 701. The container 701 is rotated about its axis in a direction 727 to convey printing material from the container 701 to a receiving element 728 of the printing system 725. This receiving element 728 may be located within an intake of a material supply station as described above. The receiving element 728 may be a funnel or hopper configured to receive the conveyed material, from which the printing material is transferred to components of the printing system 725.

Figure 7E:
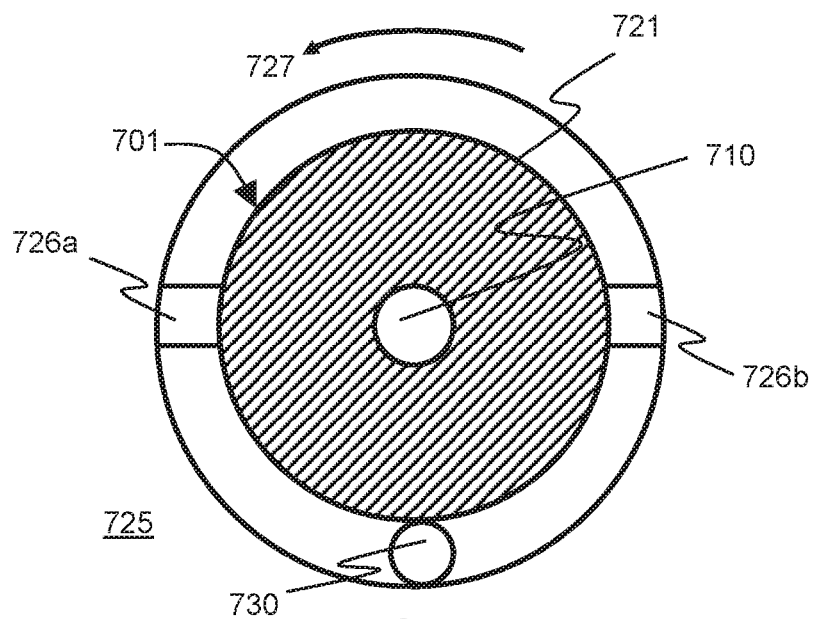

FIG. 7E shows schematically an end view of the container 701, mounted within the printing system 725. The container 701 is rotated in a direction 727 as described above. The container 701 is rotated, either directly or indirectly, by a rotating member 730 of the printing system 725. For example, the rotating member may be a wheel that is rotated in order to rotate the container 710 by friction or a cage that rotates with the container being held within the cage. As another example, the retaining members 726a, 726b may be configured to move about the central axis of the container 701 and thereby rotate the container 701. Yet another example could be that of a timing pulley and belt to drive the rotation.

Figure 8:
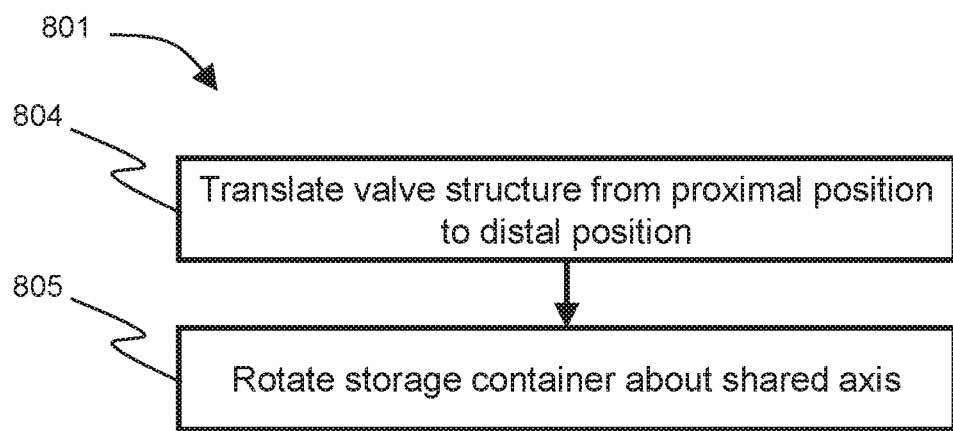
FIG. 8 is a flow chart showing a method for conveying printing material according to an example.

FIG. 8 shows a method 801 of conveying a printing material between a storage container and a printing system, for example as described above.

The method 801 comprises at block 804 translating, within a channel structure of the storage container, a valve structure from a proximal position that seals the storage container to a distal position that allows access to the storage container, for example as described above in relation to FIG. 7C. For example, the container may be supplied to a user with the valve structure in the proximal position, such that the container is sealed with printing material unable to escape. The container may further be sealed by a cap to be removed by the user, as described in more detail below. The translating may be performed by a translation element of the printing system, as described in more detail below.

The method 801 comprises, at block 805, rotating the storage container about a shared axis of the channel structure and a material-conveying member of the valve structure. As described above, this rotation causes printing material to be conveyed in a direction of the shared axis between the storage container and the printing system. For example, the printing material may be conveyed from the printing system to the container, in a filling or refilling operation, or from the container to the printing system, in a supply operation.

In examples, the storage container may be rotated at a different rate in a filling operation compared to a supply operation. For example, during a supply operation, the container may be rotated at a rate between 40 and 60 revolutions per minute. During a filling operation, the storage container may then be rotated at a faster rate, the faster rate being sufficiently high to cause the printing material to occupy an external region of the channel structure, by way of centrifugal force. This effectively causes the printing material to fill the channel structure from the outside inwards. Filling the channel structure in this manner reduces the number of gaps in the material flow, and thereby causes a more even stream of printing material into the container. This improves the efficiency of the filling operation. In one such example, a filling operation comprises rotating the container at a rate of between 80 and 120 revolutions per minute.

In some examples, following the rotation described above, the method 801 comprises translating, within the channel structure of the storage container, the valve structure from the distal position (that allows access to the storage container) to the proximal position (that seals the container). The container can thus be sealed following the filling or supply operation, in order to prevent spillage of printing material when the container is removed from the printing system.

In some examples the method 801 comprises, after translating the valve structure from the distal position to the proximal position, coupling a cap to an opening of the channel structure such that the cap exerts a contact force on the valve structure, wherein the contact force compresses a member of the valve structure within the channel structure to seal the storage container. This improves the effectiveness of the sealing, as described in more detail below.

Aspects of a further example container will now be described with reference to FIGS. 9A to 9E. FIGS. 9A to 9E show further configurations of a channel structure of an example container. The aspects described below may be used independently, or in combination with one or more of the other aspects and variations described herein.

Figure 9A:
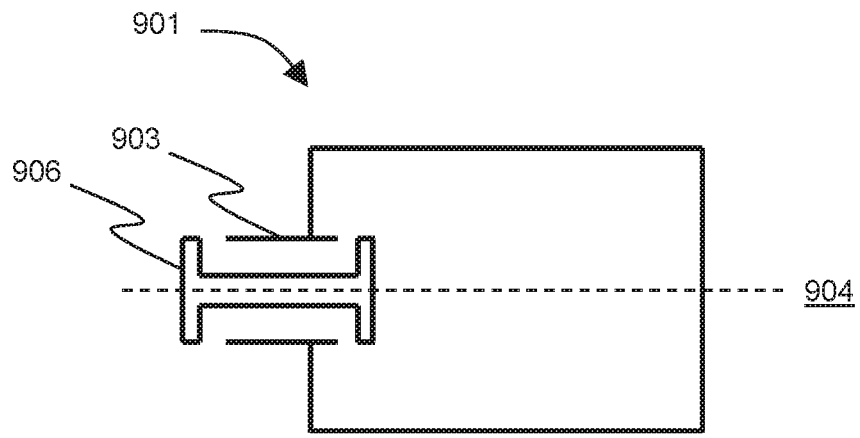
FIGS. 9A to 9E are schematic diagrams showing configurations of a channel structure for an example container.

FIG. 9A shows schematically a container 901 for storing a printing material for a printing system. The container may comprise an implementation of container 100 from FIG. 1 and/or container 701 from FIGS. 7A to 7E. The container 901 comprises a channel structure 903 for conveying the printing material. For example, this may comprise an implementation of the channel structure 150 in FIG. 1 or 704 in FIG. 7A. The channel structure 903 provides an opening of the container 901 and an axis 904 of the channel structure 903 defines an axial direction. Axis 904 may comprise axis 155 as shown in FIG. 1.

Figure 9B:
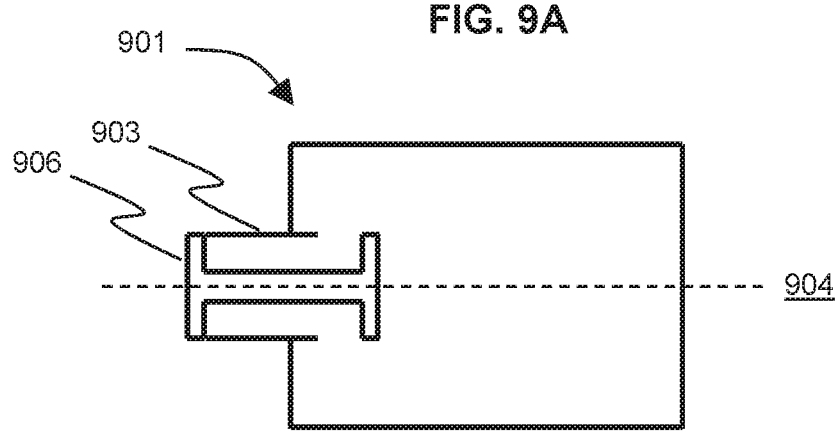

The container 901 comprises a valve structure 906 disposed within the channel structure 903. The valve structure 906 may be implemented by the valve structure 710 shown in FIGS. 7B and 7C or an alternative structure. The valve structure 906 is translatable within the channel structure between a proximal position and a distal position in the axial direction, as described above. The proximal position may comprise a position wherein the valve structure 906 is closest to the center of the container, e.g. as shown in FIG. 9B. The distal position may comprise a position wherein the valve structure 906 is located away from the center of the container, e.g. as shown in FIG. 9A wherein the valve structure 906 projects from the channel structure 903.

The valve structure 906 is further non-rotatable relative to the channel structure 903 about the axis of the channel structure. For example, relative rotation of the valve structure 906 and the channel structure 903 may be prevented by way of an element such as a notch in the valve structure 906 that interfaces with a protrusion of the channel structure 903 or, similarly, a notch in the channel structure 903 that interfaces with a protrusion of the valve structure 906.

The valve structure 906 is shown in the distal position in FIG. 9A. The amount of projection from the channel structure 903 in the distal position may vary according to different implementations and intake configurations. In the present example, the distal position allows access to the interior of the container 901, for example for conveyance of printing material from the container 901 to a printing system, or from the printing system to the container 901. The printing system in this case may be printing system 200 as shown in FIG. 2.

FIG. 9B shows the container 901, with the valve structure 906 in the proximal position. The valve structure 906 is configured to seal the channel structure when the valve structure 906 is in the proximal position, thereby preventing conveyance of printing material. The valve structure 906 may thus be used to prevent or allow conveyance of printing material, depending on its position relative to the channel structure 903. For example, the valve structure 906 may be placed into the proximal position during storage, shipping and/or handling to prevent spillage of printing material.

In some examples, the valve structure 906 comprises a material-conveying member aligned with the axis 904 of the channel structure. The material-conveying member may, for example, comprise a multi-helix screw as described in more detail above. Such a valve structure can therefore prevent conveyance of printing material when in the proximal position, and facilitate conveyance of printing material via a screw action when in the distal position.

In examples, the valve structure 906 comprises a compressible member. The compressible member is arranged to seal the channel structure when the valve structure is in the proximal position. The compressible member may be positioned circumferentially around a part of the valve structure 906, for example in such a position as to be between said part of the valve structure 906 and the interior of the channel structure 903 when the valve structure 906 is in the proximal position. For example, the compressible member may be a rubber O-ring.

Figure 9C:
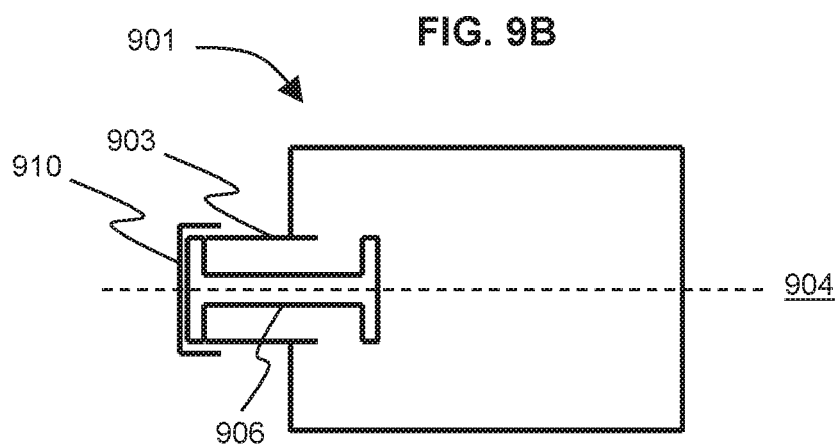

In examples, a cap is coupable to the container 901. FIG. 9C shows schematically such an example with a cap 910 coupled to the container 901. Coupling the cap to the container exerts a force on the valve structure 906, to push the valve structure 906 into the proximal position. The compressible member described above is thus compressible by coupling the cap 903 to the container, whereby to close the opening of the container. In this manner, the coupling of the cap to the container ensures a secure sealing of the channel structure 903, reducing the risk of spillage of printing material. The presence of the cap 910 also provides a visual indication to a user that the valve structure 906 is properly positioned to seal the channel structure 903. The presence of the cap 910 further acts to maintain the valve structure 906 in the proximal position, for example during shipping of the container 901.

In examples, the user manually de couples the cap 910 from the container 901 prior to inserting the container 901 into the printing system. The compressible member may be configured to remain compressed following decoupling of the cap from the container. The seal is thus maintained following decoupling of the cap. This reduces the risk of spillage of printing material, for example if the user drops the container 901 while loading it into the printing system.

Figure 9D:
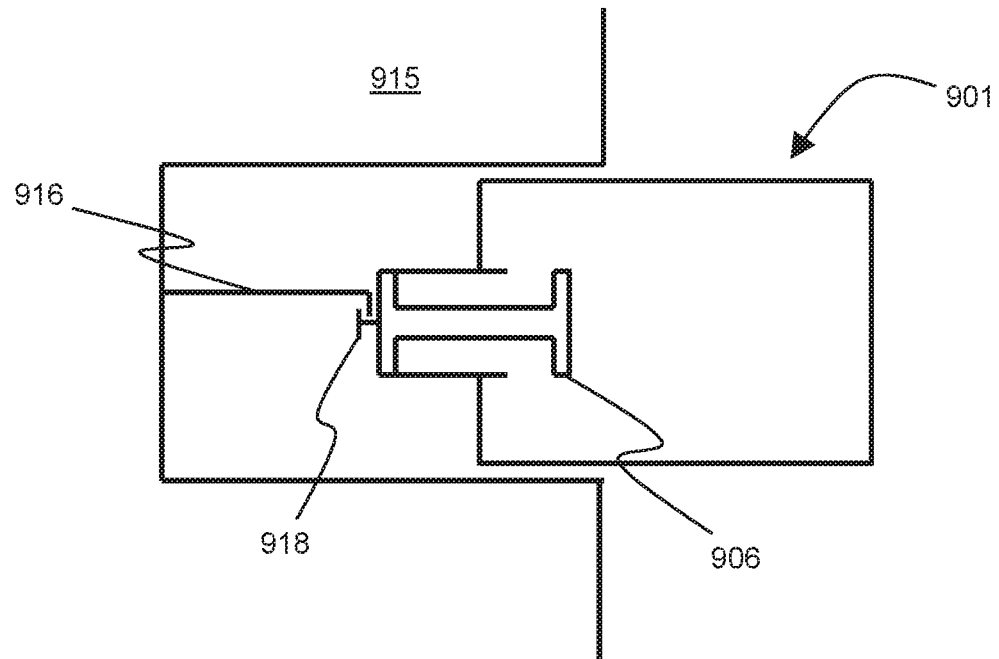

FIG. 9D shows schematically an example container 901 loaded into a printing system 915. For example, this may correspond to the insertion of container 100 as shown in FIG. 3, in particular the coupling to the intake 320 as shown in the third stage 303. This may also (or alternatively) correspond to the arrangement shown in FIG. 7D. The valve structure 906, shown in the proximal position, is configured to be translated within the channel structure by a translation member 916 of the printing system. The translation member 916 may form part of a mechanical coupling of a material supply system such as 220.

Figure 9E:
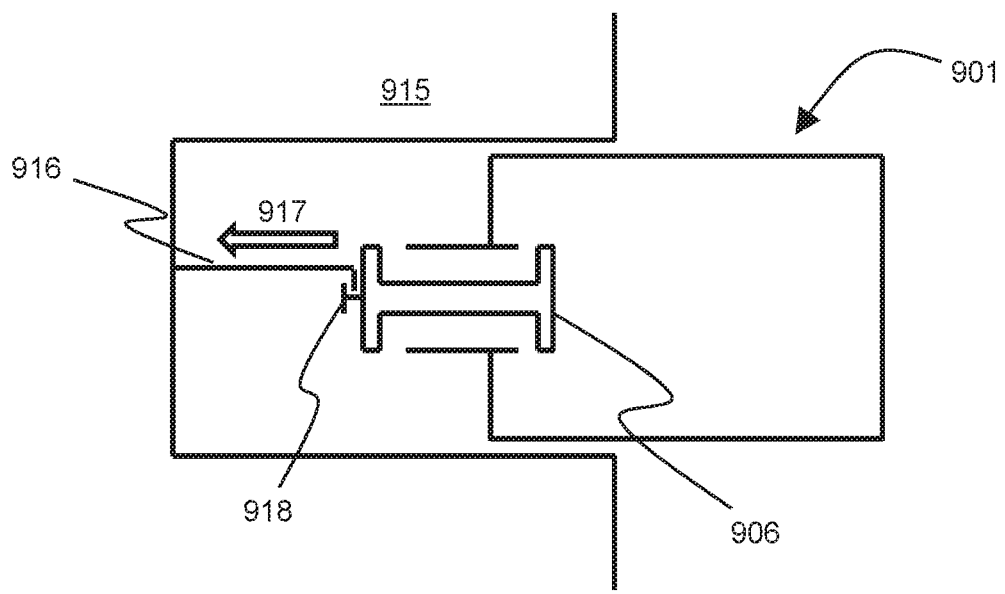

FIG. 9E shows schematically said example container 901 loaded into the printing system 915, the valve structure 906 having been translated in direction 917 into the distal position by the translation member 916. The valve structure 906 can thus remain in the proximal position, sealing the channel structure, until the container 901 is loaded into the printing system 915. Spillage of printing material during the loading operation is thereby averted. In some examples, the valve member 906 is further configured to be translated by the translation member 916 from the distal position to the proximal position prior to removing the container 901 from the printing system 915, thereby averting or reducing the spillage of printing material during and following removal of the container 901 from the printing system 915.

In some such examples and as depicted in FIGS. 9D and 9E, the valve structure 906 comprises an engagement member 918 configured to be engaged by the translation member 916 of the printing system. The engagement member may, for example, comprise a fastener, such as a screw, and a washer configured to distribute the load of the fastener. In some such examples, the translation member 916 comprises jaws configured to engage with the engagement member 918.

An example cap for a printing material container, for example to implement cap 910 as shown in FIG. 9C, will now be described with reference to FIGS. 9F and 9G.

Figure 9F:
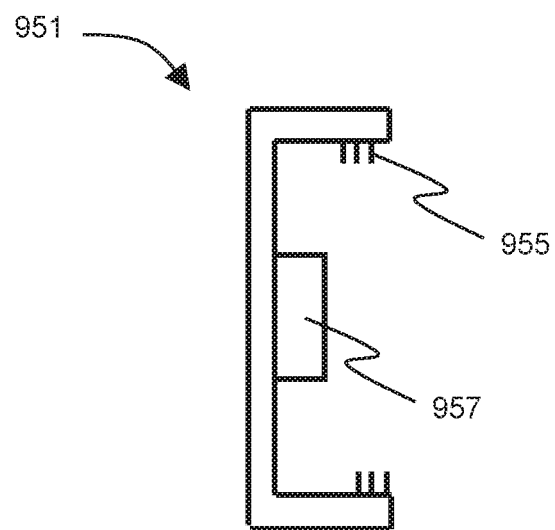
FIG. 9F to 9G are schematic diagrams showing an example cap configuration for a container.

FIG. 9F shows schematically a cross-section of a cap 951 for a printing material container. The cap 951 comprises a coupling mechanism 955 to couple the cap 951 to a channel structure of the printing material container. For example, the coupling mechanism 955 may, as shown, comprise a threaded structure, i.e. a screw thread, configured to interface with a corresponding threaded structure of the printing material container. Alternatively or additionally, the coupling mechanism 955 may comprise a latch or other means to fasten the cap 951 to the printing material container.

The cap 951 comprises a raised portion 957 extending from an inner surface of the cap 951 in an axial direction. The raised portion 957 is configured to exert a contact force on a valve structure disposed within the channel structure when the cap 951 is coupled to the channel structure. This contact force compresses a member of the valve structure to seal the printing material container, for example as described above in relation to FIG. 9C.

Figure 9G:
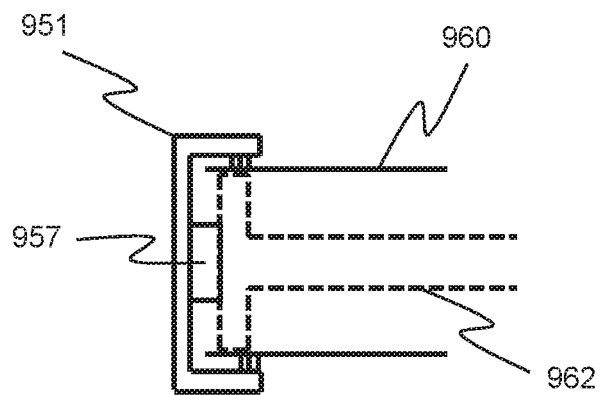

FIG. 9G shows schematically the cap 951 coupled to a channel structure 960 of a printing material container. As described above, the coupling causes the raised portion 957 to exert a contact force on a valve structure 962 disposed within the channel structure. This pushes the valve structure 962 into a proximal position in which the channel structure 960 is sealed. If the coupling mechanism 955 comprises a screw thread, screwing the cap 951 onto the channel structure applies the contact force to the valve structure 962.

The coupling of the cap 951 to the channel structure 960 thus ensures that the valve structure 962 is positioned to securely seal the channel structure 960, preventing or reducing the leakage of printing material from the container through the channel structure 960. The presence of the cap 951 also provides a visual indication that the container is sealed.

In some examples, the raised portion 957 is configured to couple with a receiving structure of the valve structure 962. For example, the raised portion 957 may couple with a corresponding seat portion of the valve structure 962. This improves the accuracy of the coupling between the raised portion 957 and the valve structure 962, thereby increasing the accuracy of positioning the valve portion in the proximal position. The receiving structure may form part of the engagement member 918 as described above.

In examples, a kit may be provided, the kit comprising a container and a cap as described above.

Figure 10:
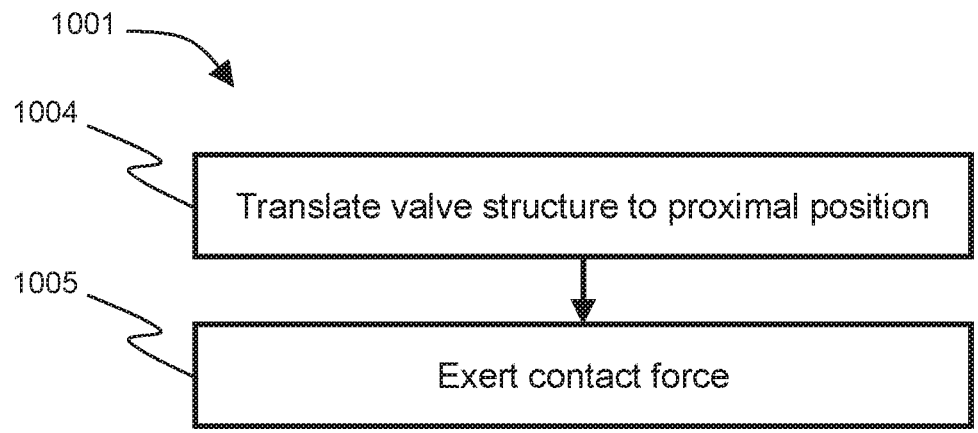
FIG. 10 is a flow chart showing a method of sealing a container according to an example.

FIG. 10 shows schematically a method 1001 of sealing a printing material container, for example a container as described above.

The method 1001 comprises, at block 1004, translating a valve structure to a proximal position in a channel structure of the printing material container, whereby to seal the channel structure as described above.

The method 1001 then comprises, at block 1005, exerting a contact force on the valve structure via a raised portion of a cap coupled to the printing material container. This block may comprise coupling a cap to the printing material container. The raised portion of the cap exerts a contact force on the valve structure. As described above, the contact force compresses a compressible sealing member of the valve structure, for example a rubber O-ring.

Figure 11:
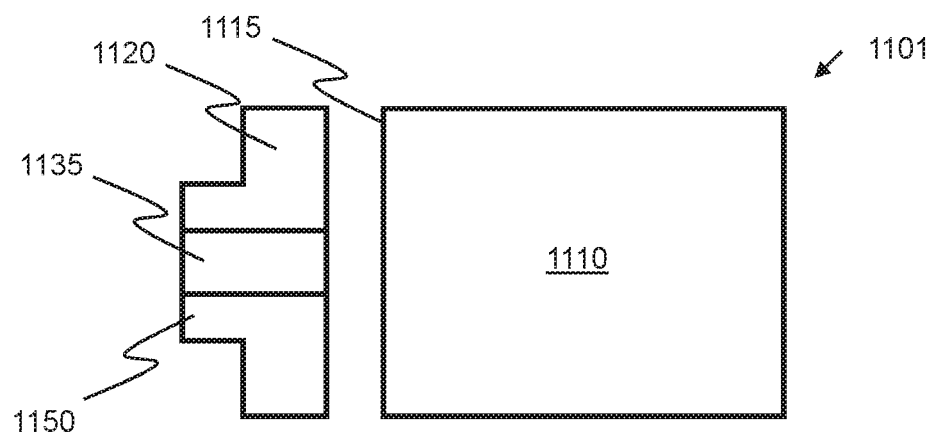
FIG. 11 is a schematic diagram showing two views of an example container formed from two independent portions.
Figure 11:
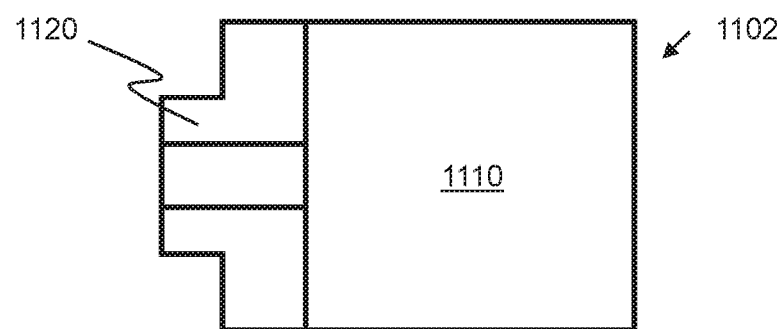

Certain examples of a container as described herein may be formed from at least two initially separate components. This is shown in FIG. 11. FIG. 11 shows a first view of an example container 1101 during manufacture. The container 1101 comprises a chamber 1110 and a base 1120. The chamber 1110 comprises a body portion of the example container 1101 and may provide a side wall and closed end such as the inner wall 120 and the closed end 140 in FIG. 1. The chamber 1110 in FIG. 11 has an open end 1115. The open end 1115 may comprise an aperture substantially equal to the diameter of the container 1110, or at least wider than the comparative opening 135 in FIG. 1. The base 1120 provides an opening 1135 and a channel structure 1150. The opening 1135 may be formed within the channel structure 1150 as shown.

In these examples, the base 1120 is configured to be inserted into the open end 1115 of the chamber 1110. For example, the base 1120 may be considered as a cover or lid for the container. FIG. 11 shows an example container 1102 formed from the base 1120 and the chamber 1110. In certain cases, the base 1120 may be affixed to the chamber 1110 following insertion, e.g. by glue and/or welding. An example method of welding the base 1120 to the chamber 1110 is described in more detail below. Having a base 1120 separate from the chamber 1110 may enable different methods of manufacture to be used for each section of the container. It may also allow different features to be present in each section. The examples below discuss some of these features. It should be noted that the functional aspects of the features below may alternative be implemented in an integral single-unit container and/or a container with more than two components.

The term "base" is used herein to denote a separate component from a main chamber of the container; it need not relate to the bottom of the container. In certain cases, the container may be stored or rested vertically upon the base, e.g. if a handle is provided at an opposite closed end of the chamber.

Figure 12A:
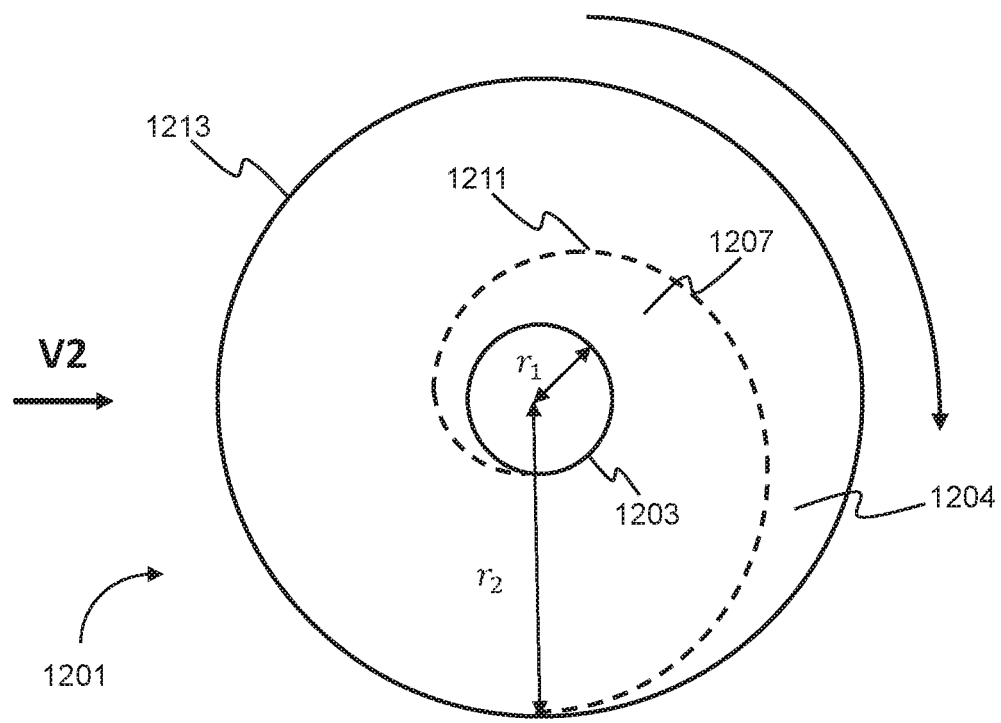
FIGS. 12A to 12F are schematic diagrams showing aspects of a material-guiding structure according to examples.
Figure 12B:
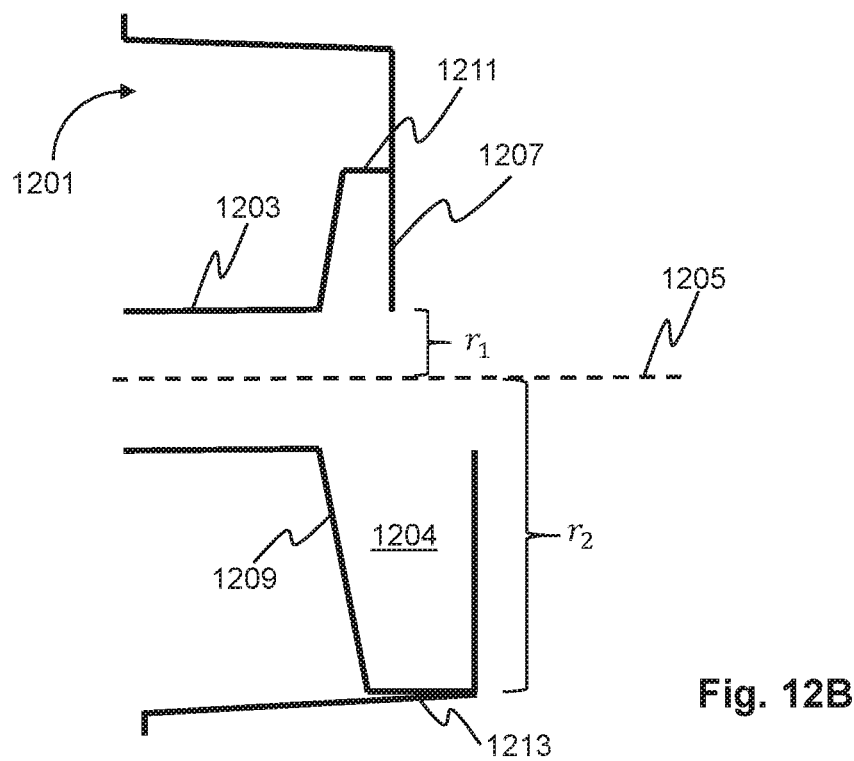
Figure 12C:
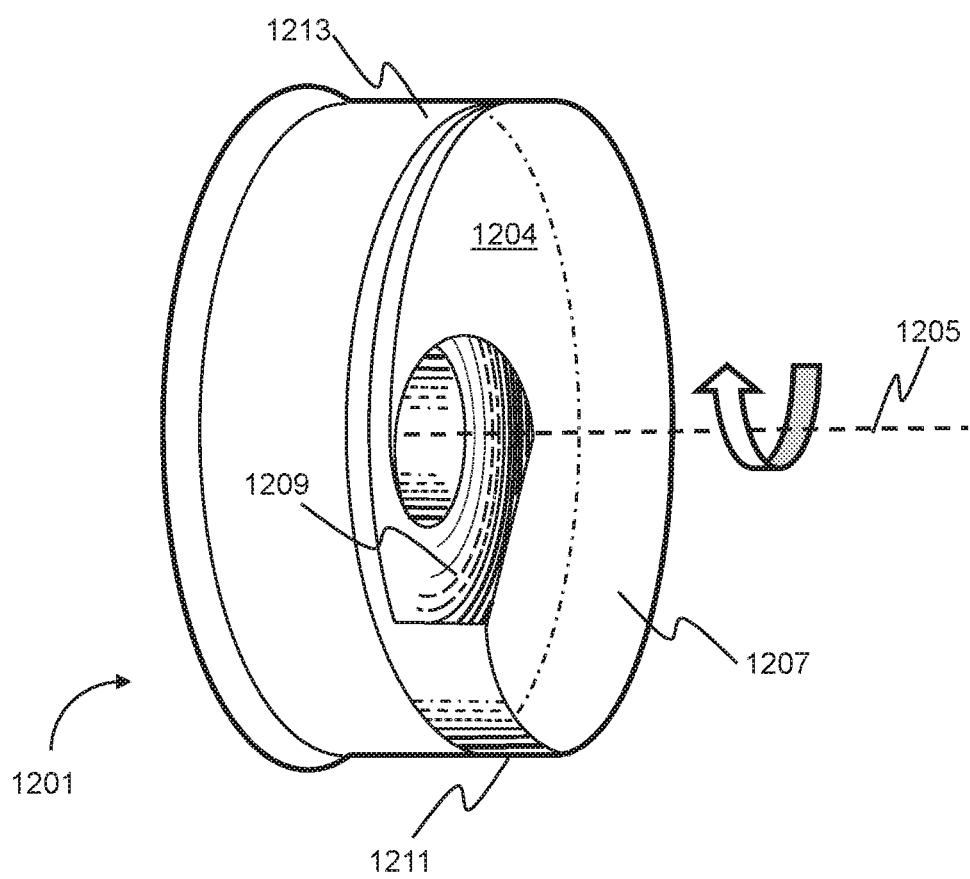

An example of a base for a printing material container will now be described with reference to FIGS. 12A-C. FIG. 12A shows a schematic top-down view of the base 1201. FIG. 12B shows a cross-section of the base 1201, viewed from the direction of the arrow labelled V2 in FIG. 12A. FIG. 12C shows an isometric view of the base 1201 viewed from a direction between the viewing direction of FIG. 12A and that of FIG. 12B.

In the present examples, base 1201 comprises a channel structure 1203 defining an opening of the base 1201. For example, the channel structure 1203 may implement channel structures 150 or 1150 to provide openings 135 or 1135 as shown respectively in FIGS. 1 and 11. In this example, the channel structure 1203 comprises an open-ended cylinder, e.g. as may be seen in FIG. 12B. In other examples, the channel structure is not cylindrical, and is instead shaped as an open-ended prism having a regular or irregular polygonal cross-section. A channel structure may be symmetric about an axis or may not be symmetric about an axis. A channel structure may have a cross-section that varies along an axis, for example a channel structure may be conically-shaped.

An axis 1205 of the channel structure 1203 defines an axial direction. This may implement the axis 155 described with reference to FIG. 1. For examples in which a channel structure is not symmetric about an axis, an axis of the channel structure may be defined as an axis of an opening of the base 1201.

In the present example, a material-guiding structure 1204 is formed around the opening of the base 1201. The material-guiding structure 1204 has a helical lower surface 1207 that extends from the channel structure 1203 in the axial direction, as shown in FIG. 12O. For example, the material-guiding structure may be seen as a "screw scoop". The helical lower surface 1207 is shaped as a portion of a helicoid, truncated in the axial direction and in the radial direction. Accordingly, the axial position of any point on the helical lower surface 1207 with respect to a fixed point on the axis 1205 varies linearly with the angular position of the point about the axis 1205. In other examples, a helical lower surface may not be shaped as a portion of a helicoid, and the axial position of any point on a helical lower surface may vary according to a different functional relationship. For example, the axial position of any point on a helical lower surface with respect to a fixed point on an axis may vary such that the pitch of the helical lower surface varies with the angle about an axis. The pitch of a helical surface is the axial distance occupied by a curve segment on the helical surface that subtends an angle of one full rotation about the axis of the helical surface. The material-guiding structure 1204 may have a function when performing one or more of supplying printing material from the container and filling the container with printing material. In the former case, the material-guiding structure 1204 may "scoop" printing material and deposit it into a material-conveying member. In the latter case, a "scoop" or interior volume of the material-guiding structure 1204 may receive material from the material-conveying member during rotation and guide this material to the start of helical ribs or flighting within the container.

In one example, a pitch of the helical lower surface 1207 is chosen such that during a process of conveying printing material from a storage container comprising the base 1201 to a printing system, a desired amount of printing material is transferred for a given revolution of the storage container, as will be described hereafter.

An upper surface of the material-guiding structure 1204 is formed by a lower surface 1209 of the base 1201. In this example, the lower surface 1209 of the base 1201 is substantially conical such that each point on the lower surface 1209 of the base 1201 has a normal that makes a non-zero angle with the axial direction. In other examples, an upper surface of a material-guiding structure has a normal that is aligned with the axial direction, e.g. is flat. In other examples, an upper surface of a material-guiding structure is helical. For example, an upper surface of a material-guiding structure may have substantially the same shape as a helical lower surface of the material-guiding structure. In yet other examples, the upper surface of a material-guiding structure may be separate from a surface of the base, e.g. the "scoop" portion may be provided as a separate component that is fastened or otherwise coupled to the base or container.

In FIGS. 12A-C, the helical lower surface 1207 meets the lower surface 1209 of the base 1201 at a curved side wall 1211 that extends radially from the channel structure 1203 to an annular portion 1213 of the base 1201. In this example, the outer surface of the annular portion 1213 of the base is conical. In other examples, the outer surface of an annular portion of a base is cylindrical.

In the example of FIGS. 12A-C, the curved side wall 1211 forms a curve of narrowing radius. In particular, the radial distance of the curved side wall 1211 from the axis 1205 decreases from a maximum radius $r_2$ at a first angular position to a minimum radius $r_1$ at a second angular position. In this example, the curved side wall 1211 subtends an angle of one full rotation about the axis 1205 so that the first angular position is the same as the second angular position. In other examples, the curved side wall subtends an angle of less than one full rotation about the axis 1205. For example, the radial distance of a curved side wall may decrease from a maximum value to a minimum value in half of a rotation. In other examples, the curved side wall subtends an angle of more than one full rotation about the axis 1205. For example, the curved side wall may decrease from a maximum radius to a minimum over multiple full rotations.

In the example of FIGS. 12A-C, the maximum radius $r_2$ of the curved side wall 1211 is between two and four times the minimum radius $r_1$ of the curved side wall 1211. More specifically, in this example the maximum radius $r_2$ of the curved side wall 1211 is approximately 9 cm and the minimum radius $r_1$ of the curved side wall 1211 is approximately 3 cm, so in this example the maximum radius $r_2$ of the curved side wall 1211 is approximately three times the minimum radius $r_1$ of the curved side wall 1211. The ratio of the maximum radius $r_2$ to the minimum radius $r_1$ is chosen such that during a process of conveying printing material from a storage container comprising the base 1201 to a printing system, a desired amount of printing material is transferred for a given revolution of the storage container, as will be described hereafter. For example, this may be achieved when a given quantity of printing material is present in the container. The material-guiding structure may be designed to have a predefined volume to achieve this.

The narrowing radius of the curved side wall 1211 is a continuously narrowing radius. In this example, the radial distance of the curved side wall 1211 from the axis 1205 decreases continuously with increasing angular separation from the part of the curved side wall 1211 having a maximum radius $r_2$. Furthermore, in this example the radial distance of the curved side wall 1211 from the axis 1205 decreases smoothly such that there are no corners in the curved side wall 1211. The continuously narrowing radius of the side wall 1211 allows for printing material to be smoothly conveyed during a process of conveying printing material from a storage container comprising the base 1201 to a printing system, resulting in the printing material being conveyed with an even consistency, and not having variations in consistency that may otherwise be caused if the side wall 1211 did not have a continuously narrowing radius.

In the example of FIGS. 12A-C, the material-guiding structure 1204 is an integral molded element of the base 1201. In this example, the base 1201 is formed during an injection molding process. In other examples, a base is formed by other molding processes, for example structural foam molding or compression molding. In other examples, a base is formed during a first process, a material-guiding structure is formed during a second process, and the base and the material-guiding structure are then attached to each other, for example by screw-fit or snap fit techniques, or using a welding technique.

The material-guiding structure 1204 of base 1201 is configured to convey printing material to a material-conveying member when the base is rotated about the axis of the channel structure 1203. For example, this material-conveying member may comprise the multi-helix screw 710 as shown in FIGS. 7A to 7E. The material-conveying structure may be located within the opening formed in the channel structure 1203. In this example, the base 1201 is configured such that when it is oriented with the axis 1205 substantially horizontal, and with the region of the curved side wall 1211 with the maximum radius $r_2$ vertically below the axis 1205, then rotated in the direction indicated in FIGS. 12A and 12C, printing material may be guided along the material-guiding structure 1204 towards a material-conveying member at least partially disposed within the channel structure 1203.

In examples in which a material-guiding structure is configured to convey printing material to a material-conveying member when the base is rotated about the axis of a channel structure, the material-conveying member is configured to convey printer material through the channel structure. In the example of FIGS. 12A-C, a material-conveying member may be provided that is translatable in the axial direction within the channel structure 1203 of the base 1201. In other examples, a material-conveying member may be provided that is fixed in an axial direction with respect to a channel structure of a base for a printing material container. In some examples, a material-conveying member is provided as an integral molded element of a base for a printing material container.

In some examples in which a material-conveying member is configured to convey printer material through the channel structure of the base 1201 of FIGS. 12A-C, the material-conveying member is a multi-helix screw at least partially disposed within the channel structure, as previously described. In a more specific example, the multi-helix screw is a double-helix screw.

In some examples, the material-conveying member is configured to convey printing material through the channel structure 1203. In the example described above, the multi-helix screw has a fixed orientation with respect to the base 1201, and is thereby configured to rotate with the base 1201 about the axis 1205 of the channel structure 1203, causing printing material to be conveyed through the channel structure.

In the example of FIGS. 12A-12C, the material-guiding structure 1204 is configured to guide a discrete dose of material, e.g. when certain material fill conditions are met. In this example, the material-guiding structure 1204 is configured such that when the base 1201 is oriented with the axis 1205 substantially horizontal, and with the region of the curved side wall 1211 with the maximum radius $r_2$ vertically below the axis 1205, then rotated by one full rotation in the direction indicated in FIGS. 12A and 12C, a discrete dose of printing material may be guided along the material-guiding structure 1204. Providing that the angle subtended by the curved side wall 1211 about the axis 1205 is one full rotation causes a discrete dose of printing material to be guided when the base 1201 is rotated by one full rotation, as all of the printing material that enters the material-guiding structure may be guided to the channel structure 1203. In other examples, the angle subtended by a curved side wall is less than a full rotation. In these examples, the material-guiding structure may be configured to guide a discrete dose of printing material when the base is rotated by less than a full rotation.

A method of conveying a printing material between a storage container and a printing system will now be described with reference to FIGS. 12D and 12E, which respectively show cross sections of a storage container 1215 in two different orientations, and FIG. 13, which shows blocks of the method 1301. At block 1304, the method comprises providing a storage container 1215 with an integral scoop 1217, the integral scoop 1217 being arranged around a channel structure 1219 of the storage container 1215. This may comprise supplying a filled storage container 1215 to a location of use. In this example, the storage container 1215 is substantially cylindrical and has an axis 1221. In other examples, a storage container is provided that is not cylindrical or generally cylindrical. In this example, the channel structure 1219 is an open-ended cylinder. In other examples, a storage container is provided with a channel structure that is not an open-ended cylinder, as described above with reference to FIGS. 12A-C. The integral scoop 1217 may comprise the material-guiding structure 1204 as shown in FIGS. 12A-C.

The integral scoop 1217 has a helical floor 1223 that surrounds an opening of the channel structure 1219. In this example, the helical floor 1223 is shaped as a portion of a helicoid, truncated in the axial direction and in the radial direction. Accordingly, the axial position of any point on the helical floor 1223 with respect to a fixed point varies linearly with the angular position of the point about an axis 1221 of the container 1215. In other examples, a helical lower surface may not be shaped as a portion of a helicoid, as described above with reference to FIGS. 12A-C.

A join 1225 between the helical floor 1223 and a surface 1227 of the storage container 1215 forms a curve of narrowing radius. In this example, the radial distance of the join 1223 from the axis 1205 decreases from a maximum radius at a first angular position to a minimum radius at a second angular position. In this example, the join 1225 subtends an angle of one full rotation about the axis 1205 so that the first angular position is the same as the second angular position. In other examples, the join subtends an angle other than one full rotation.

At block 1305, the method comprises rotating the storage container 1215 about the axis 1221. In this example, the axis 1221 is substantially horizontal. In other examples, a storage container may be rotated about an axis that makes a non-zero angle with the horizontal. In some examples, a storage container may be oriented such that an end of the storage container comprising the channel structure is lower than an opposite end of the storage container. Rotation may be performed in a manner similar to that illustrated in FIG. 4.

Rotation of the storage container 1215 rotates the integral scoop 1217 within the storage container 1215 to convey the printing material between the channel structure 1219 and an interior of the container 1215. For example, the integral scoop 1217 may be fixably mounted within the storage container 1215 such that rotation of the storage container 1215 rotates the integral scoop 1217 at the same speed, e.g. the integral scoop 1217 is fixed with respect to the container housing. In the example of FIG. 12D, the storage container 1215 is initially oriented such that the portion of the join 1225 with the maximum radial distance from the axis 1221 is vertically below the axis 1221. In this orientation, an open portion of the integral scoop 1217 is underneath a top surface of printing material 1229.

Figure 12D:
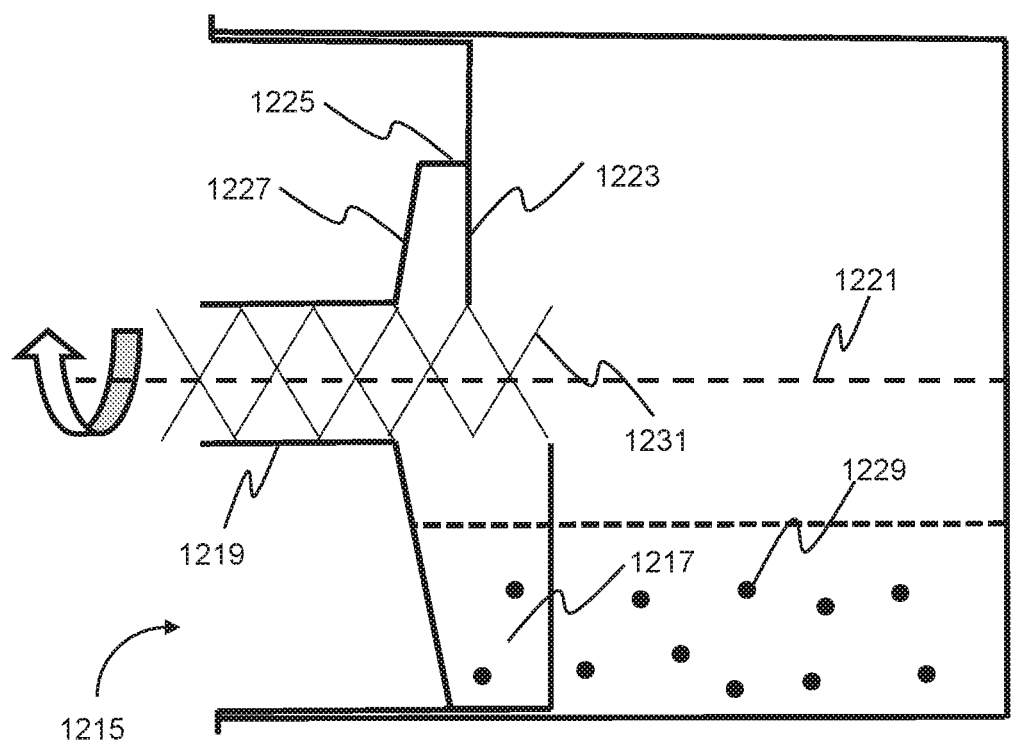

The storage container 1215 is rotated in the direction indicated by the arrows in FIG. 12D. After the storage container 1215 has been rotated by half of a rotation, some of the printing material 1229 has been conveyed from the interior of the container 1215 to the channel structure 1219 (where the black dots in FIGS. 12D and 12E represent printing material particles), and the storage container 1215 is oriented as shown in FIG. 12E. After the storage container 1215 has been rotated by a further half rotation, more of the printing material 1229 has been conveyed from the interior of the container 1215 to the channel structure 1219, and the storage container is again oriented as in FIG. 12D.

In another example, the storage container 1215 is rotated in a second direction that is opposite to the direction indicated by the arrows in FIG. 12D. When the storage container 1215 is rotated in the second direction, printing material is conveyed from the channel structure 1219 to the interior of the storage container 1215.

The rotation of the storage container 1215 causes the integral scoop 1217 to operate as an Archimedes screw, whereby to convey the printing material 1229. In the example of FIG. 12D, when the storage container 1215 rotates in the direction indicated by the arrows, the helical floor 1223 conveys printing material towards the channel structure 1219 in a direction of the axis 1221.

In some examples, rotating the storage container 1215 comprises conveying at least one discrete dose of printing material. During operation of a printing system, several discrete doses of printing material may be conveyed.

Figure 12E:
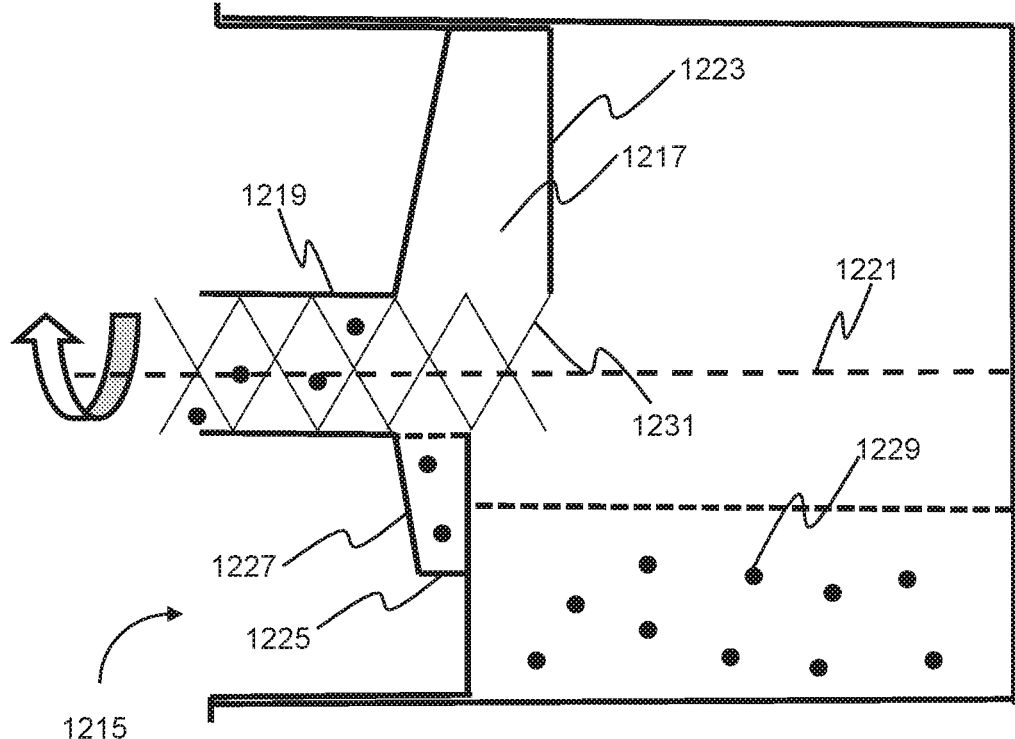
Figure 13:
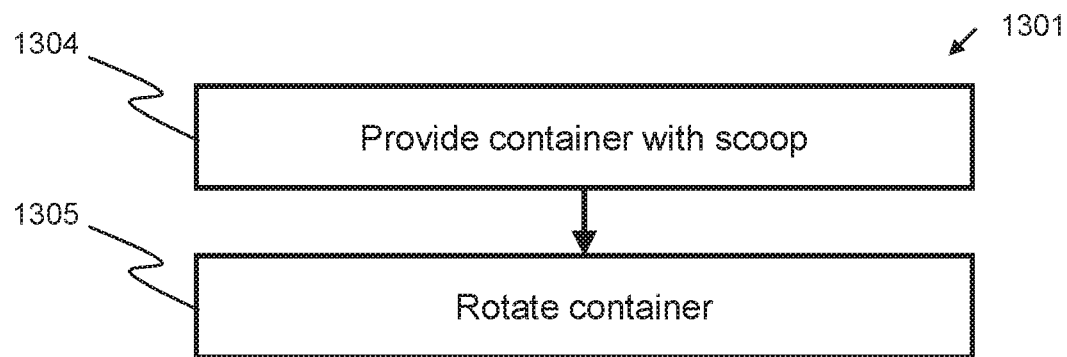
FIG. 13 is a flow chart showing a method for conveying printing material according to an example.

In the example of FIGS. 12D and 12E, conveying at least one discrete dose of printing material may comprise conveying a single dose of printing material for a given 360-degree rotation of the storage container. In this example, the storage container 1215 starts in the orientation shown in FIG. 12D, and a discrete dose of printing material is conveyed when the storage container 1215 undergoes one full 360-degree rotation in the direction indicated by the arrows in FIG. 12D. In other examples, a discrete dose is conveyed when a storage container is rotated by multiple 360-degree rotations. In other examples, a discrete dose is conveyed when a storage container is rotated by less than a 360-degree rotation.

In some examples, the method of conveying a printing material between a storage container and a printing system comprises conveying printing material to a material-conveying member at least partially disposed within the channel structure. In the example of FIGS. 12D and 12E, a multi-helix screw 1231 is partially disposed within the channel structure 1219, and rotating the storage container 1215 in the direction indicated by the arrows causes the printing material 1229 to be conveyed to the multi-helix screw 1231. The multi-helix screw 1231 rotates with the storage container 1215, causing printing material 1229 to be conveyed through the channel structure, as shown in FIG. 12E.

In some examples, the rotation of the storage container is performed by a rotating element of a printing apparatus. In some examples, a rotating element is an element that releasably couples to a storage container and rotates in unison with the storage container. In other examples, a rotating element is an element that does not rotate in unison with the storage container. For example, a rotating element may comprise rollers that are configured to abut an outer surface of a storage container.

Figure 12F:
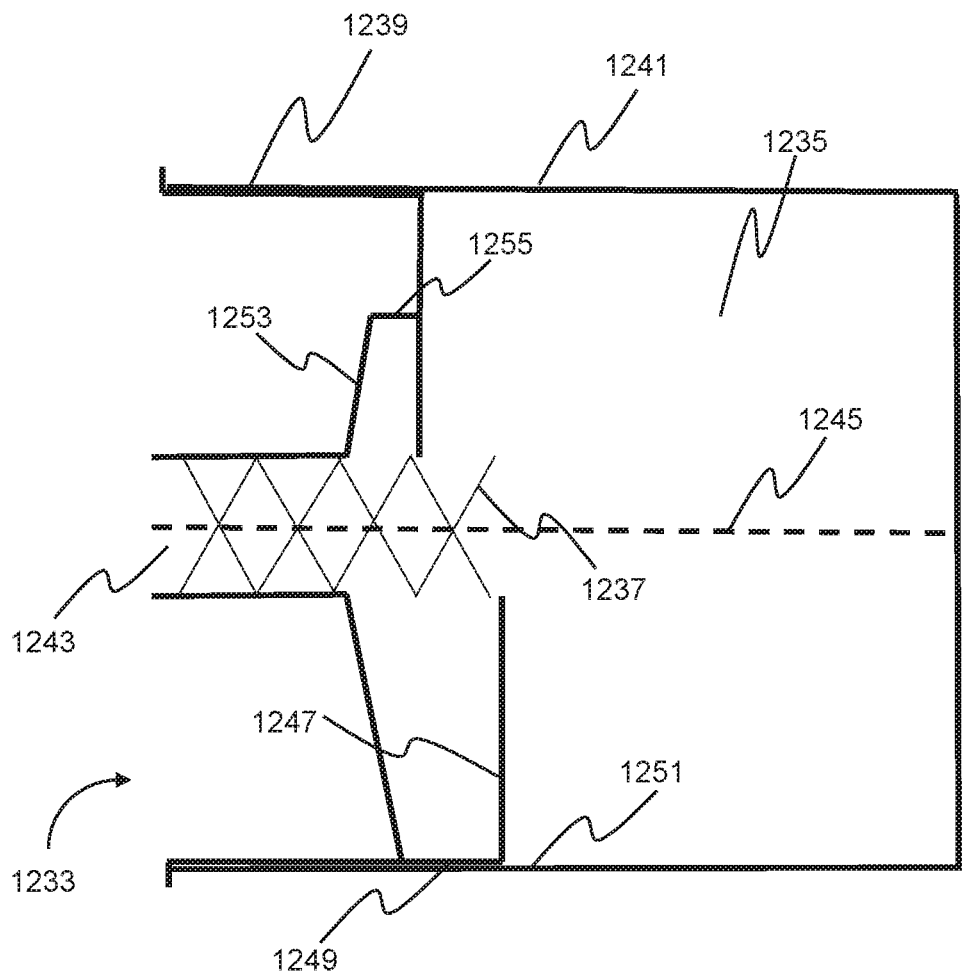

Another example of a container for a printing system will now be described with reference to FIG. 12F, which shows a cross section of a container 1233 for a printing system. In this example, the container 1233 is substantially cylindrical. In other examples, a container is not substantially cylindrical, and is instead substantially shaped as a prism having a regular or irregular polygonal cross-section. A container may be symmetric about an axis or may not be symmetric about an axis. A container may have a cross-section that varies along an axis, for example a storage container may be conically-shaped.

The container 1233 comprises a chamber 1235 for storing a printing material. In this example, the chamber 1235 is substantially cylindrical, i.e. is generally cylindrical and/or has at least one or more substantially cylindrical portions. In other examples, a chamber for storing a printing material is not substantially cylindrical. A chamber for storing a printing material may have a shape corresponding to the shape of an outer surface of the container.

The container 1233 comprises a material-conveying member. In this example, the material-conveying member is a multi-helix screw 1237. Specifically, in this example the multi-helix screw 1237 is a double-helix screw.

The container 1233 comprises a base 1239. In this example, the base 1239 is welded to a body portion 1241 of the container 1233. In other examples, a base may joined to a body of a container by a snap-fit means. In other examples, a base may be joined to a body of a container by a screw-fit means.

The base 1239 comprises opening 1243 for receiving the material-conveying member (multi-helix screw 1237). A shared axis 1245 of the opening 1243 and the material-conveying member (multi-helix screw 1237) defines an axial direction of the container. The base comprises a material-guiding structure formed around the opening 1243, having a helical lower surface 1247 that extends from the base 1239 into the chamber 1235 in the axial direction. The helical lower surface 1247 is shaped as a portion of a helicoid, truncated in the axial direction and in the radial direction. Accordingly, the axial position of any point on the helical lower surface 1247 with respect to a fixed point on the axis 1245 varies linearly with the angular position of the point about the axis 1245. In other examples, a helical lower surface may not be shaped as a portion of a helicoid, and the axial position of any point on a helical lower surface may vary according to a different functional relationship. For example, the axial position of any point on a helical lower surface with respect to a fixed point on the axis 1245 may vary such that the pitch of the helical lower surface varies with the angle about an axis.

A portion of an outer side wall 1249 of the material-guiding structure abuts an inner side wall 1251 of the chamber 1235. In this example, the portion of the outer side wall 1249 that abuts the inner side wall 1251 abuts a curved inner side wall 1251 of the chamber 1235. In other examples, a portion of an outer side wall of a material-guiding structure abuts a raised portion of an inner side wall of a chamber. In some such examples, the raised portion is flat.

An upper surface of the material-guiding structure is formed by a lower surface 1253 of the base 1239. In this example, the lower surface 1253 of the base 1239 is substantially conical such that each point on the lower surface 1253 of the base 1239 has a normal that makes a non-zero angle with the axial direction. In other examples, an upper surface of a material-guiding structure has a normal that is aligned with the axial direction. In other examples, an upper surface of a material-guiding structure is helical. For example, an upper surface of a material-guiding structure may have substantially the same shape as a helical lower surface of the material-guiding structure.

The helical lower surface 1247 meets the lower surface 1253 of the base 1239 at a curved side wall 1255 that extends radially from the channel structure to the outer side wall. In this example, the curved side wall 1255 forms a curve of narrowing radius. In particular, the radial distance of the curved side wall 1255 from the axis 1245 decreases from a maximum radius at a first angular position to a minimum radius at a second angular position. In this example, the curved side wall 1255 subtends an angle of one full rotation about the axis 1245 so that the first angular position is the same as the second angular position. In other examples, the curved side wall subtends an angle of less than one full rotation about the axis 1245. For example, the radial distance of a curved side wall may decrease from a maximum value to a minimum value in half of a rotation. In other examples, the curved side wall subtends an angle of more than one full rotation about the axis 1245. For example, the curved side wall may decrease from a maximum radius to a minimum over multiple full rotations.

Figure 14:
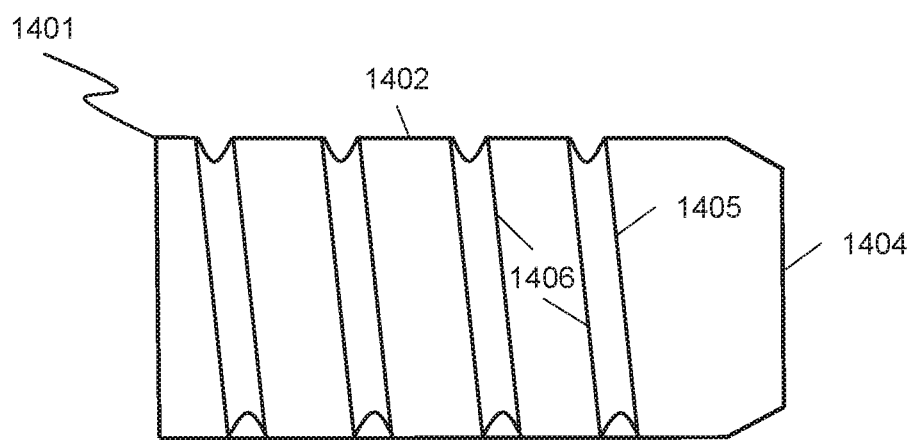
FIG. 14 is a schematic diagram showing an external view of an example container.

FIG. 14 shows an example container 1401 that comprises a rotatable chamber 1402 for storing printing material. The rotatable chamber 1402 has an opening 1404 that in use receives a base such as shown in FIG. 11. The rotatable chamber has an inner structure 1405. The inner structure 1405 conveys the printing material between an interior of the cylindrical chamber 1402 and the opening 1404 during rotation of the container 1401. In the example shown in FIG. 14, the inner structure 1405 is a structural feature of the inner surface of the container wall of the cylindrical chamber 1402. As the container 1401 rotates the inner structure 1405 rotates with the chamber 1402 to convey printing material to and from the opening 1404. The inner structure 1605 may comprise a series of helical ribs or protrusions to move printing material along the container 1601, either during supply or filling.

In certain cases, the inner structure 1405 forms a helix structure in the inner surface of the container wall. In one case, the inner structure 1405 forms a continuous helix structure within the inner surface. In another case, the inner structure 1405 is disjointed where each raised portion in a set of raised portions forms a partial helix structure.

In one case, the inner structure 1405 conveys printing material between the rotatable chamber and at least one material-conveying structure forming part of the base during rotation. The at least one material-conveying structure may comprise at least one of the material-conveying member and the material-guiding structure as described herein. Further possible features of the inner structure are described in more detail in the example of FIGS. 16A to C.

Figure 15:
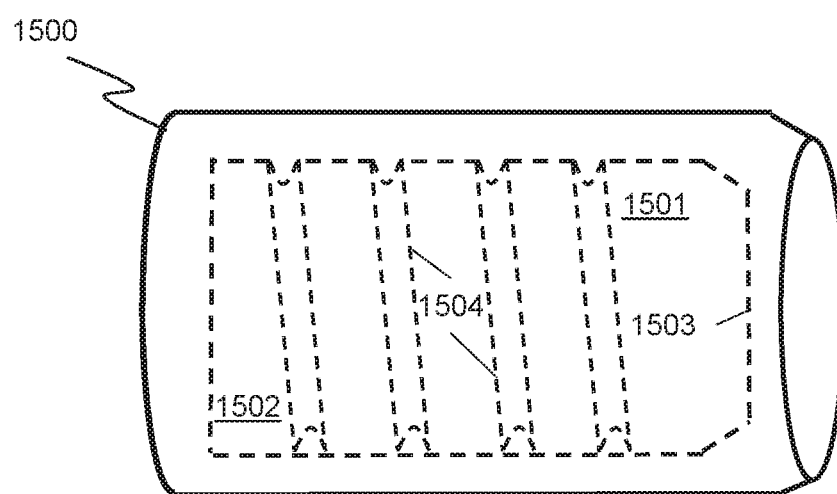
FIG. 15 is a schematic diagram showing a mold for manufacturing the example container of FIG. 14.

FIG. 15 shows a mold 1500 for a printing material chamber such as the container 1401 shown in FIG. 14, according to an example. The mold comprises a surface to define an outer wall 1501 of the printing material chamber. In the example shown in FIG. 15 the outer wall 1501 of the printing material chamber defined by the mold 1500 is generally cylindrical. The outer wall 1501 comprises a closed portion 1502 at one end and an open portion 1503 at the other end. According to examples described herein, the mold 1500 comprises one or more raised surface features 1504. The one or more raised surface features 1504 form corresponding indentations in the outer wall of the printing material chamber. The indentations form raised portions on an inner wall of the printing material chamber. FIG. 15 shows the raised surface features 1504 of the mold 1500 which define the corresponding indentations. In the example of FIG. 15 the raised surface features 1504 result in the formation of helical ribs or 'flighting' in the printing material chamber. The indentations may comprise two sets of indentations, one set for each side of the printing material chamber.

A further example container, comprising certain features, will now be described with reference to FIGS. 16A to 16C and 17.

Figure 16A:
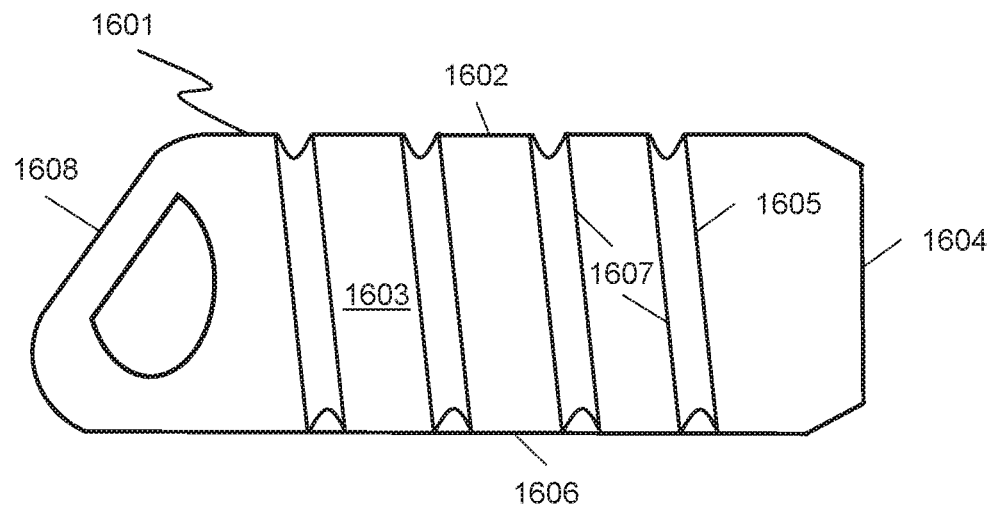
FIGS. 16A-C are schematic diagrams showing views of an example container having a handle and a planar portion.
Figure 16B:
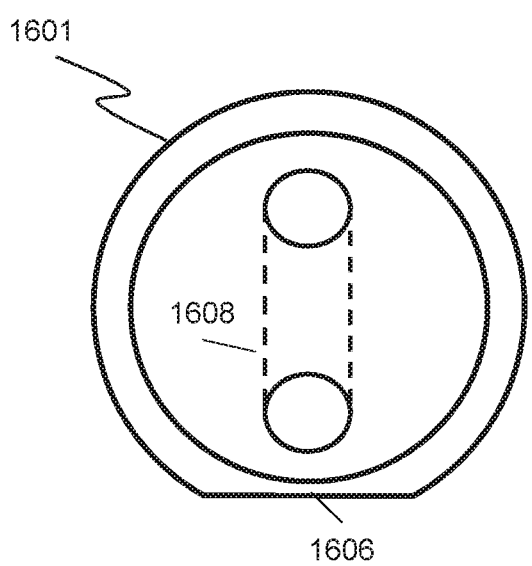
Figure 16C:
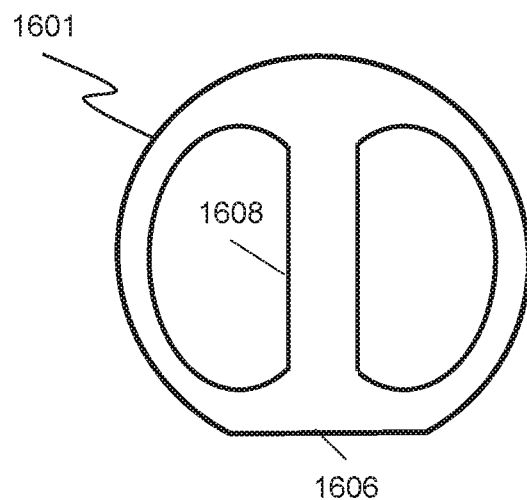

FIGS. 16A-C show schematically a container 1601 for storing a printing material for printing. According to examples, the container 1601 is used to contain printing material suitable for two-dimensional and three-dimensional printing as described herein. The container 1601 comprises a generally cylindrical chamber 1602 formed by a container wall 1603. The chamber 1602 has an opening 1604 at one end. In the example shown in FIGS. 16A-C, the container 1601 is closed at the other end.

According to examples described herein the container 1601 comprises an inner structure 1605. The inner structure 1605 conveys the printing material between an interior of the chamber 1602 and the opening 1604 during rotation of the container 1601. In the example shown in FIGS. 16A-C, the inner structure 1605 is a structural feature of the inner surface of the container wall 1603 of the chamber 1602. In other examples, the inner structure 1605 is a portion separate from the chamber and is removable from the container 1601. The inner structure 1605 is non-rotatable relative to the chamber 1602 of the container 1601. As the container 1601 rotates the inner structure 1605 rotates with the chamber 1602 to convey printing material to and from the opening 1604. The inner structure 1605 may comprise a series of helical ribs or protrusions to move printing material along the container 1601, either during supply or filling.

In FIG. 16A, the container wall 1603 comprises an outer surface. The outer surface of the container wall 1603 comprises a planar portion 1606. According to an example, the planar portion 1606 extends across a substantial proportion of the width and the length of container 1601 to form a base of the container 1601. In comparison to a generally cylindrical container, the container 1601 can be placed to rest stably on a surface on the planar portion.

The planar portion 1606 further provides an orientation of the container 1601. For example, the planar portion 1606 is used to align the container 1601 in a material supply station, such as during an insertion operation as shown in FIG. 3. The planar portion 1606 may be used to align the container 1601 within a cage used for rotation. A generally cylindrical container provides no indication of an orientation of the container 1601. In contrast, the described container 1601 is inserted into a material supply station using the planar portion 1606 as a guiding structure to orientate the container 1601 during insertion. For example, a passageway forming part of the mounting 310 in FIG. 3 may be arranged with a flat surface to receive and guide planar portion 1606. Also, generally cylindrical containers are prone to rolling during transportation or storage. The planar portion 1606 provides a surface on which to rest the container 1601 during transportation or storage.

In the example of the container 1601 shown in FIGS. 16A-C, the inner structure 1605 comprises a plurality of portions 1607 in the inner surface of the container wall 1603. The raised portions 1607 are raised on the inside of the container 1601. In the example shown in FIGS. 16A-C, the raised portions 1607 are positioned at intervals along the length of the chamber 1602 and surround the chamber 1602. The raised portions help to convey printing material between the interior of the chamber and the opening of the container during rotation of the container.

In certain cases, the raised portions 1607 form a helix structure in the inner surface of the container wall 1603. In one case, the raised portions 1609 are connected to form a continuous helix structure within the inner surface. In another case, the raised portions 1607 are disjointed where each raised portion forms a partial helix structure. The raised portions 1607 pass through the planar portion 1606 on the base of the container.

The raised portions 1607 forming the helix structure on the inner surface of the container 1601 help transfer printing material from the interior of the chamber 1602 towards the opening 1604 of the container 1601 when the container 1601 is rotated. Printing material that comes into contact with the helix structure is moved by the helical portions in a direction parallel to the axis of rotation of the container 1601. This reduces the amount of printing material that becomes stationary with respect to the axial direction and encourages printing material to move towards or away from the opening 1604 of the container 1601.

The helix structure on the container 1601 shown in FIGS. 16A-C extends around the chamber 1602 approximately four times. This number may vary in other examples. The helix is angled sufficiently to ensure a consistent transfer of printing material in the container 1601 when the container 1601 is rotated. In examples described herein, the rate of transmission of printing material in the container 1601 is not substantially affected when the raised portions 1607 do not pass through the planar portion.

In certain cases, the raised portions 1607 are rounded. Rounding off the raised portion 1607 helps to ensure that printing material cannot become stuck in or around the raised portions 1607. This reduces the risk of printing material becoming compacted or gather in a particular region of the container.

In the example of the container 1601 shown in FIGS. 16A-C, the container 1601 comprises a handle portion 1608. The handle portion 1608 is formed at the closed end of the container 1601. The handle portion 1608 allows a user to hold the container 1601 and position the container 1601 to rest on the planar portion 1606 according to examples described herein. In the example of a container 1601 shown in FIGS. 16A-C, the handle portion 1608 comprises an elongate hand grip that extends in a direction substantially perpendicular to the planar portion 1606. This allows the container 1601 to easily be gripped by a user and, in particular, helps a user to align the container 1601 on the planar portion 1606 on a resting surface. Moreover, the grip is formed within the container 1601. This can be manufactured in the same process as the chamber of the container 1601.

In some examples, the handle portion 1608 may comprise a wall thickness, hardness, toughness, and strength sufficient to withstand the loaded weight of build material within the handle portion 1608 and chamber 1602, as well as resisting fracture and/or denting upon the container 1601 being inadvertently mishandled (e.g. dropped, etc.). In some examples, at least the handle portion 1608 may be formed of a polymer material, such as high density polyethylene (HDPE), any number of different polymers, or combinations thereof. In some examples, at least some these same materials may be used to form the chamber 1602.

In some examples, an inner wall surface of the handle portion 1608 and/or of the chamber 1602 may comprise a low coefficient of friction. This arrangement may facilitate flowability of printing material within container 1601, including handle portion 1608. In some examples, the inner wall surface of the handle portion 1608 and/or chamber 1602 may comprise a lubricous coating to enhance such flowability.

In certain examples of the container 1601 described herein, such as shown in FIGS. 16A-C, the elongate hand grip is aligned at a non-zero angle to a plane of a base of the cylindrical chamber 1602. In the example shown in FIGS. 16A-C the handle portion 1608 is at an angle of approximately 60 degrees to the base of the container 1601 containing the planar portion 1606. However, in other cases the elongate handle portion 1608 is angled at a different degree to the horizontal.

Angling the elongate handle portion 1608 with respect to a base portion allows a user to control the motion of the container 1601. In particular, the angled elongate handle portion 1608 gives an improved weight distribution across the container 1601 when held by the handle portion.

According to examples described herein the planar portion 1606 of the container 1601 further comprises a notch portion. The notch portion is an inwardly pointing indentation within the outer wall of the container 1601. The notch portion is used to latch the container into a material supply station.

FIGS. 16B and 16C show two alternative views of the container 1601. FIG. 16B shows a view of the container 1601 looking in from the opening 1604. In FIG. 16B the interior of the container 1601 is shown including the interior portion of the elongated handle portion 1608. According to examples, the interior of the elongated handle portion 1610 is hollow. Printing material may thus be stored in the handle portion 1610. FIG. 16B also shows the planar portion 1608. The view of the container 1601 shown in FIG. 16C shows a view of the exterior handle portion 1608 of the container. It can be seen from the view of the container 1601 shown in FIG. 16C that the handle portion 1608 extends in a direction substantially perpendicular to the planar portion 1606.

Figure 17:
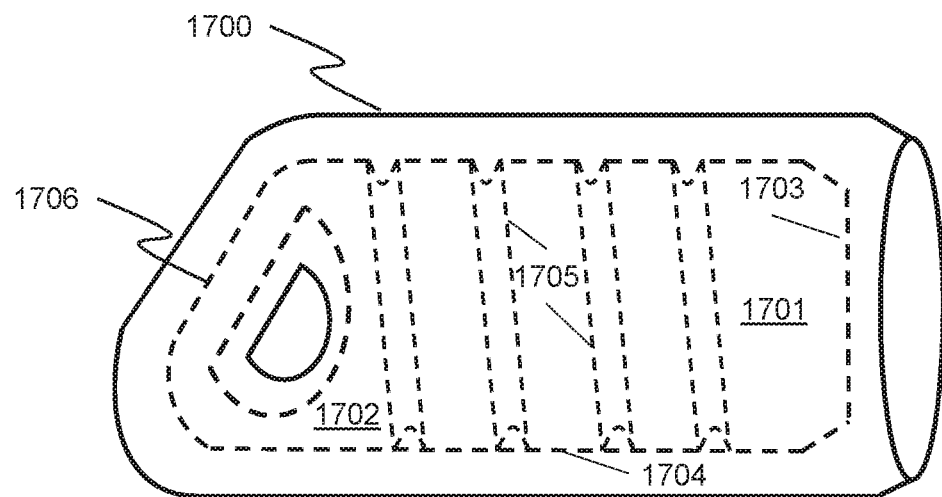
FIG. 17 is a schematic diagram showing a mold for manufacturing the example container of FIGS. 16A-C.

FIG. 17 shows a mold 1700 for a printing material chamber such as the container 1601 shown in FIG. 16, according to an example. The mold comprises a surface to define an outer wall 1701 of the printing material chamber. In the example shown in FIG. 17 the outer wall 1701 of the printing material chamber defined by the mold 1700 is cylindrical. The outer wall 1701 comprises a closed portion 1702 at one end and an open portion 1703 at the other end. The surface of the mold comprises a planar portion 1704 projecting into the surface of the mold. When the mold 1700 is used the planar portion 1704 defines a corresponding planar portion in the outer wall of the printing material chamber. The planar portion of the printing material chamber aligns the chamber on a resting surface.

According to examples described herein, the mold 1700 comprises one or more raised surface features 1705. The one or more raised surface features 1705 form corresponding indentation in the outer wall of the printing material chamber. The indentations form raised portions on an inner wall of the printing material chamber. FIG. 17 shows the raised surface features 1705 of the mold 1700 which define the corresponding indentations. In the example of FIG. 17 the raised surface features 1705 result in the formation of helical ribs or 'flighting' in the printing material chamber.

In examples, the one or more raised surface features of the mold 1700 are rounded. The rounded raised surface features form corresponding rounded raised portions in the inner wall of the printing material chamber.

In the example of the mold shown in FIG. 17, the mold 1700 further comprises a channel to define a handle portion 1706. The handle portion 1706 forms part of the closed end 1702 of the printing material chamber. The handle 1706 formed by the mold shown in FIG. 17 is an elongate handle portion that is angled with respect to the planar portion, similar to the handle portion of the container shown in FIG. 16.

According to an example, the mold 1700 further comprises a notch portion that projects in to the planar portion of the surface of the mold. The notch defines a corresponding notch portion in the outer wall of the printing material chamber. The notch portion in the outer wall is used to latch the printing material chamber in a material supply station.

A further example container, implementing examples of the present disclosure, will now be described with reference to FIGS. 18A and 18B and 19.

Figure 18A:
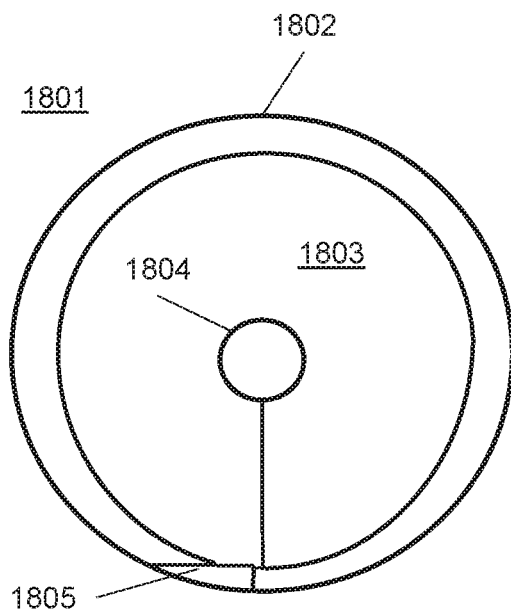
FIGS. 18A and 18B are schematic diagrams showing a raised planar portion in an example container.
Figure 18B:
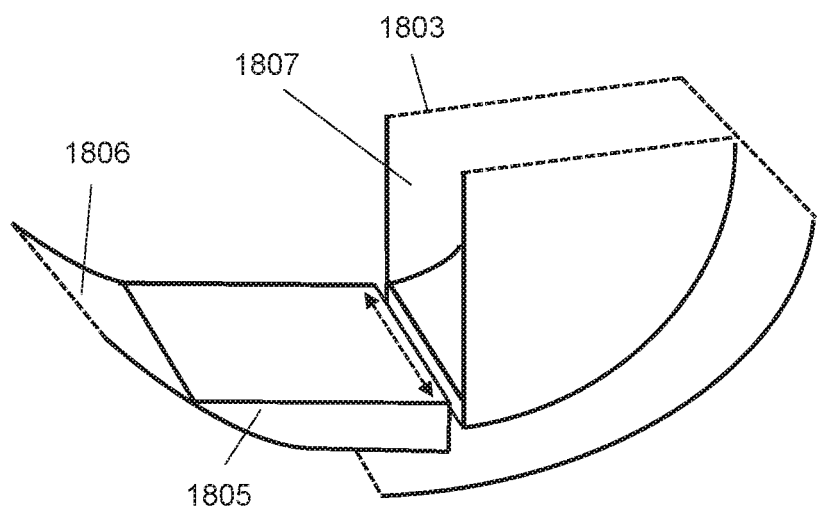

FIGS. 18A and 18B show schematically two views of a portion of a container 1801, e.g. for use with a material supply station of a printing system, according to an example. The container may be any one of the example containers described herein. FIG. 18A shows a view looking into an opening of the container 1801. The container 1801 comprises a chamber 1802 for storing printing material and a material-guiding structure 1803. The material-guiding structure 1803 is formed around a channel structure 1804 of the container. The material-guiding structure 1803 is arranged to guide printing material between an interior of the printing material container 1801 and the channel structure 1804 of the printing material container 1801 when the container 1801 is rotated about a central axis, for example axis 155 in FIG. 1.

The printing material container 1801 shown in FIGS. 18A and 18B comprises a raised portion 1805 within an inner surface 1806 of the chamber 1802. FIG. 18B shows a close up view of the raised portion 1805 and the material-guiding structure 1803. The raised portion 1805 is arranged to guide the printing material into an opening 1807 of the material-guiding structure 1803. In certain examples described herein, the material-guiding structure 1803 has a helical shape in the form of an Archimedes screw that guides printing material towards the channel structure 1804. The opening of the material-guiding structure 1803 forms a scoop shape which helps to transfer printing material towards the channel structure 1804. The material-guiding structure 1803 may comprise the material-guiding structure 1204 shown in FIGS. 12A-12F.

The raised portion 1805 helps to maximize the amount of printing material that is deposited in the opening 1807 of the material-guiding structure 1803 and minimize the amount of printing material that becomes stranded in the chamber 1802 as the container 1801 rotates in the material supply station. According to examples, the raised portion 1805 is formed as an indentation in the inner wall of the container. In other cases, the raised portion is a separate portion that is attached to the container 1801.

In examples described herein, the raised portion 1805 is adjacent in the container 1801 to the material-guiding structure 1803. This is shown in FIG. 18B. The adjacency is with respect to an annular surface of the container 1801 and the material-guiding structure 1803. The raised portion 1805 may be as close as possible to the material-guiding structure 1803 within the constraints imposed by a manufacturing processes of the container 1801. In particular, the opening of the material-guiding structure 1803 is almost flush to (i.e. abuts) the raised portion 1803. This further minimizes the amount of printing material that becomes stranded in the container 1801 as it rotates.

In the example shown in FIG. 18B, the width of the raised portion 1805 is equal to a width of the opening 1807 of the material-guiding structure 1803, as indicated by the dotted arrow in FIG. 18B. This maximizes the amount of printing material which is transferred from the raised portion 1805 to the opening of the material-guiding structure 1803. In other cases, the raised portion 1805 may have a width that is greater than, or less than, the width of the opening 1807.

According to certain examples, the raised portion 1805 is a planar portion. In other words, the raised portion 1805 forms a raised flattened platform on which printing material accumulates during rotation of the container 1801. In this case, printing material is transferred to the opening of the container from the planar portion to the material-guiding structure 1803 as the container rotates.

In further examples of the container 1800, the inner surface 1806 of the chamber 1802 comprises one or more "ribs" or "flighting" to guide printing material to the opening of the material-guiding structure 1803. For example, these are shown in FIGS. 14 and 16A. The one or more ribs are comprised around the edge of the inner surface 1806 and, in certain cases, are formed as indentations in the inner surface during a manufacturing process of the container 1801. As described in relation to other examples of containers described herein, the ribs are in certain cases helical ribs that spiral around the inner surface of the container. During rotation, the ribs encourage the motion of printing material between an interior of the container 1801 and the opening of the container 1801.

In one example, one of the ribs is positioned such that it meets with the raised portion 1805 in the inner surface 1806 of the container 1801. For example, in one case, a rib is manufactured into the inner surface such that the rib blends into the raised portion 1805. In this arrangement, printing material that is moved by the rib during rotation of the container is guided on to the surface of the raised portion 1805.

In a further example, the raised portion 1805 of the container 1801 has a height above the inner surface of the chamber 1802, such that a plane of the raised portion 1805 and a plane of the opening of the material-guiding structure 1803 are substantially aligned. This is shown in FIG. 18B. This helps to ensure printing material does not become stuck at the lip of the opening of the material-guiding structure 1803 as the container 1801 rotates.

In certain examples described herein, the container 1801 comprises a further planar portion which forms a base of the container, as described in relation to FIGS. 16A-16C. The further planar portion extends along the length and the width of the container 1801. According to examples, the raised portion 1803 is formed in the further planar portion of the container 1801. This simplifies a manufacturing procedure where the container is constructed from a mold, since the raised portion 1803 can be pressed into a flattened portion, as opposed to a cylindrical portion of the outer wall of the container 1801. In particular, in certain examples the resulting manufacturing process produces a container 1801 where the raised portion 1805 is planar. As described elsewhere, the wall of the container 1801 may be manufactured by blow-molding.

Figure 19:
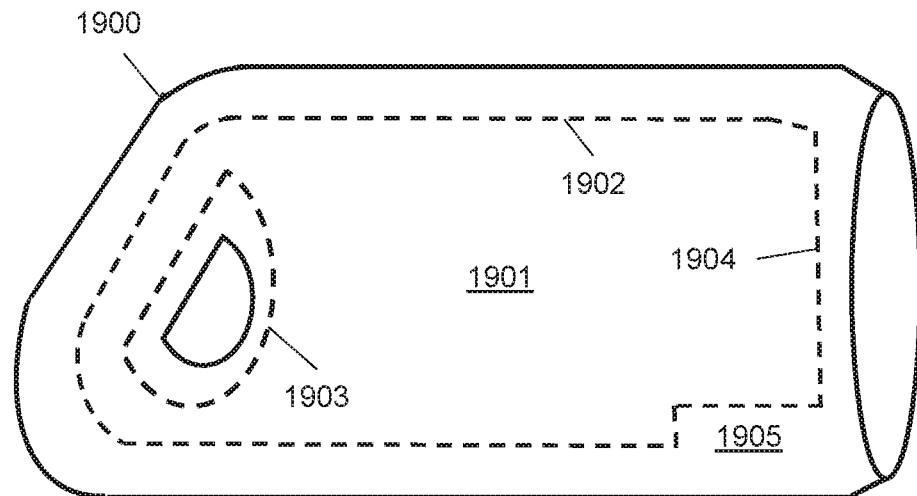
FIG. 19 is a schematic diagram showing a mold for manufacturing the example container of FIGS. 18A-B.

FIG. 19 is schematic diagram of a mold 1900 for a printing material chamber according to an example. The mold 1900 is used in a manufacturing process such as those described herein. The mold 1900 comprises a surface 1901 to define an outer wall 1902 of the printing material chamber. The outer wall 1902 has a closed lower portion 1903 and an open top portion 1904. The open top portion 1904 is dimensioned, i.e. sized appropriately, to receive a corresponding material-guiding structure. The material-guiding structure may form part of a base 1120 as shown in FIG. 11. According to examples described herein, the surface 1901 of the mold 1900 comprises a raised portion 1905. The raised portion 1905 forms a corresponding raised portion in an inner wall of the chamber to guide printing material into the material-guiding structure, such as that shown in FIGS. 18A and 18B.

In an example, the surface 1901 of the mold 1900 comprising the raised portion is positioned such that, when inserted into the opening 1904, the material-guiding structure is adjacent to the indentation forming the raised portion in the inner wall of the printing material chamber.

In a further example, the surface 1901 comprises one or more ridges that form indentations in the outer wall of the printing material chamber. The indentations form corresponding ribs within the inner wall of the printing material chamber. The ribs guide printing material towards the material-guiding structure. In one case, the ridges form helical portions on the surface 1901 of the mold 1900. The helical ridges form a corresponding helical ribs in the printing material chamber, e.g. as described with reference to other examples.

In certain cases, one of the ridges is arranged to merge into the raised portion 1905 of the mold 1900 such that the corresponding rib in the printing material chamber contacts the raise portion. According to another example of the mold 1900, the mold comprises a planar portion to form a corresponding planar portion within the inner wall of the printing material chamber. In such a case, according to an example, the mold 1900 is such that the raised portion is formed as a raised section of this planar portion. The resulting corresponding raised portion in the printing material chamber is, in certain cases, also planar.

Figure 20A:
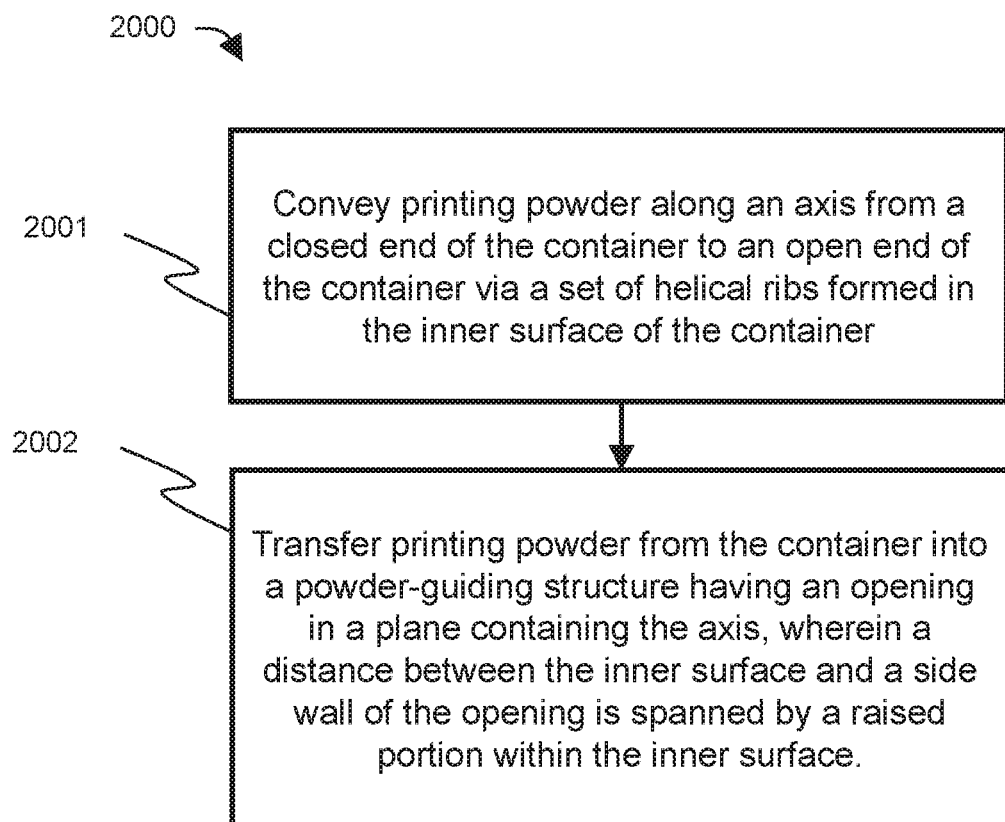
FIGS. 20A and 20B are flow charts showing example methods of conveying a printing material.
Figure 20B:
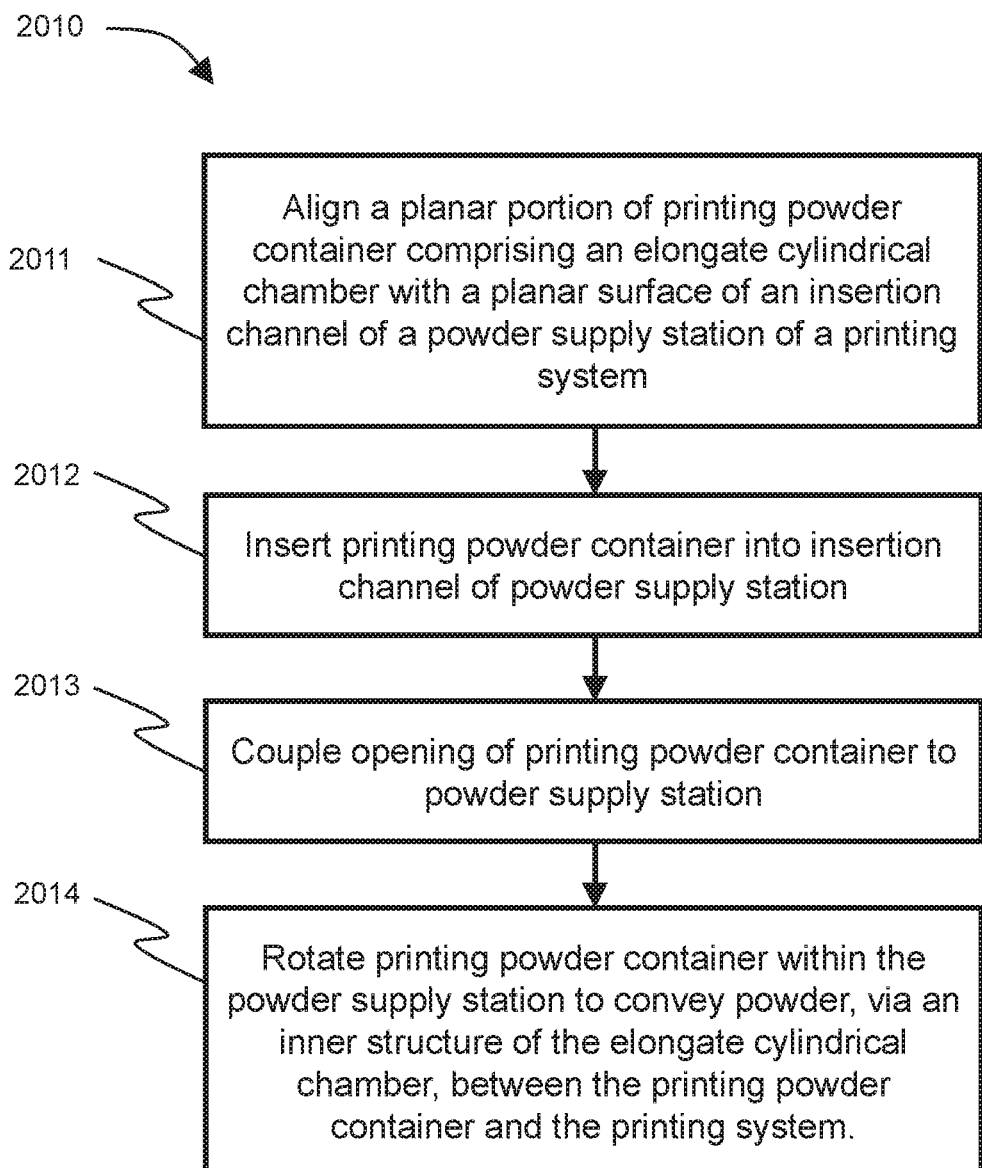

FIGS. 20A and 20B show methods of conveying printing material based on the example containers of FIGS. 16A to 19.

FIG. 20A shows a method 2001 of conveying printing material such as powder from a container according to an example. The method 2001 is used with the examples of containers described herein. At block 2001, printing material is conveyed along an axis from a closed end of the container to an open end of the container via a set of helical ribs. The helical ribs are formed in the inner surface of the container. At block 2002, printing material is transferred from the container into a material-guiding structure, the material-guiding structure having an opening in a plane containing the axis, wherein a distance between the inner surface and a side wall of the opening is spanned by a raised portion within the inner surface.

The method 2001 and examples of the container 1800 described herein can be used to minimize the amount of stranded printing material in the container 1800 when the container is rotated in a material supply station. The raised portion may be manufactured into the container 1800 using the same processes that are used to manufacture the container 1800 itself.

FIG. 20B shows a method 2010 of conveying printing material between a printing material container comprising an elongate generally cylindrical chamber and a printing system, according to an example. At block 2011, the printing material container is aligned with a planar surface of an insertion channel of a material supply station of the printing system. At block 2012, the printing material container is inserted into the insertion channel of the material supply station. At block 2013, an opening of the printing material container is coupled to the material supply station. For example, this may follow the routine showed in FIG. 3. At block 2014, the printing material container is rotated within the material supply station to convey, via an inner structure of the elongate cylindrical chamber, printing material between the printing material container and the printing system. For example, this is shown in FIG. 4. The method 2010 is used in the context of examples described herein. In particular the method is used with the container shown in FIGS. 16A-C.

In certain examples of the method 2010 described herein, aligning the planar portion of the printing material container comprises gripping an angled handle at a closed end of the elongate generally cylindrical chamber and inserting the printing material container comprises applying a force along an axis of the chamber via the angled handle.

An example of a method of manufacturing a container for a printing material will now be described. The method may be used to manufacture a container as described in any of the examples set out herein.

Figure 21A:
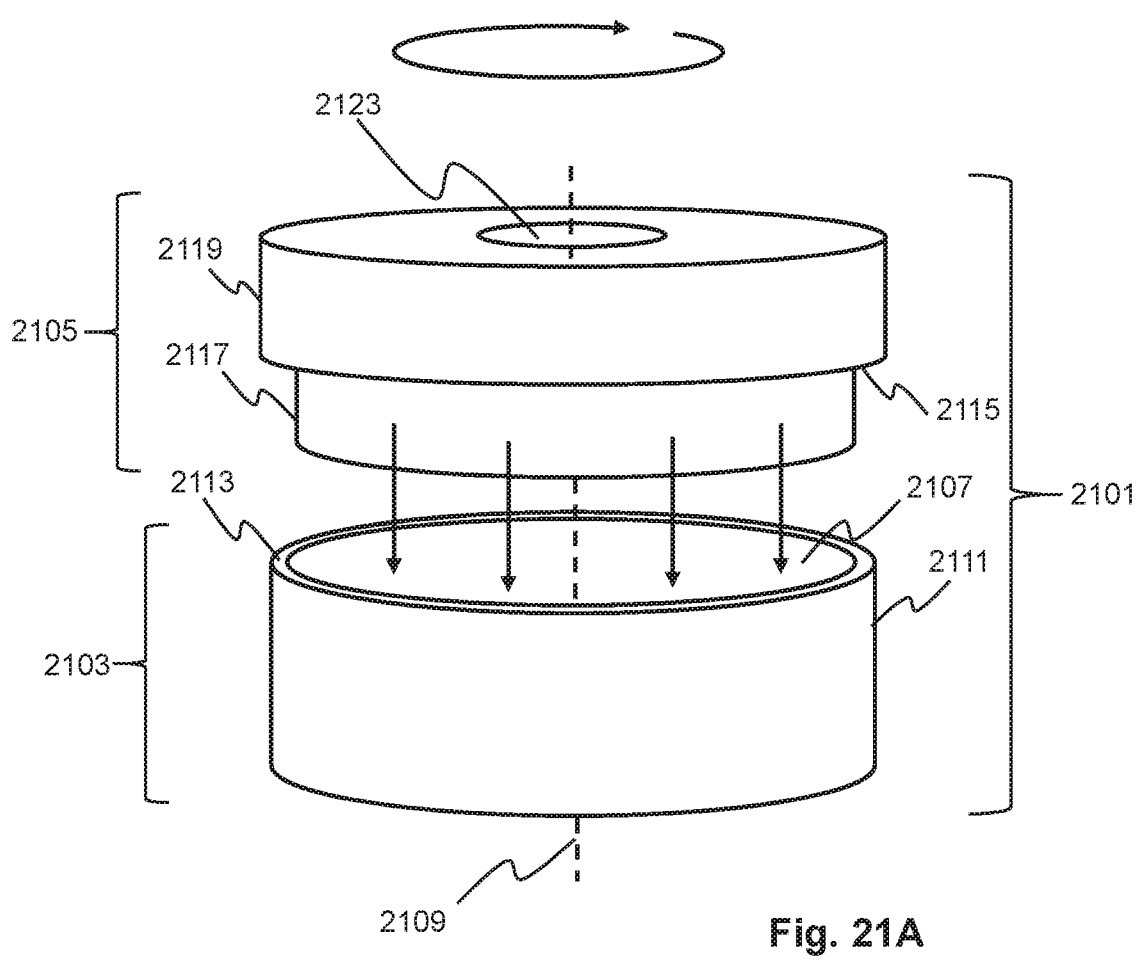
FIGS. 21A to 21D are schematic diagrams illustrating a process of joining portions of a container according to an example.

FIG. 21A shows components of a container that may be used in the method of manufacture. A first portion 2103 and a second portion 2105 are provided. The first portion 2103 and the second portion 2105 may comprise the base 1120 and chamber 1110 as described with reference to FIG. 12. In the present example, the first portion 2103 is substantially formed of a first material and the second portion 2105 is substantially formed of a second material, the first material and the second material both being thermoplastic materials. A thermoplastic material is a material that exhibits plastic behavior when its temperature is greater than a certain temperature, and is solid when its temperature drops below the certain temperature. Certain synthetic polymers are examples of thermoplastic materials. In this example, the first portion 2103 and the second portion 2105 are substantially formed of different grades of a single thermoplastic polymer. In other examples, a first portion and a second portion may be substantially formed of the same grade of a single thermoplastic polymer. Different grades of a polymer may have different properties, including different melting temperatures and different viscosities. In further examples, a first portion and a second portion may be substantially formed of different thermoplastic polymers.

In the example of FIG. 21A, the first portion 2103 and the second portion 2105 are both substantially cylindrical in shape, such that the first portion 2103 and second portion 2105 have outer surfaces with circular symmetry. In other examples, portions of differing shapes are provided. For example, either one or both of the portions may have outer surfaces with regular or irregular polygonal cross-sections. Portions may have outer surfaces with cross sections that are symmetric about an axis, or may have outer surfaces with cross sections that are not symmetric about an axis. Portions may have cross-sections that vary along an axis.

The first portion 2103 comprises a circular opening 2107 having an axis 2109. The opening 2107 is circumscribed by an annular wall 2111. The annular wall 2111 has circular symmetry about the axis 2109. In this example, the annular wall 2111 has a rim consisting of a flat upper surface 2113 with a normal that is parallel to the axis 2109, referred to hereafter as an axial direction. In other examples, a first container portion has an annular wall with a rim that does not have a flat upper surface with a normal in an axial direction. For example, a first container portion may have an annular wall with an upper surface having a normal that makes a non-zero angle with the axial direction, such that the upper surface is a conical surface. In some examples, a first container portion has a rim with a normal that varies with radial distance from an axis of the portion. In some examples, a first container portion has a rim with more than one upper surface.

The second portion 2105 comprises an annular cavity 2115 for receiving the annular wall 2111. In FIG. 21A, the first portion 2103 and the second portion 2105 are aligned coaxially, with axis 2109 arranged as an axis of the annular cavity 2115. In this example, the annular cavity 2115 is partially bounded by a radially outward-facing surface 2117 and by a lip 2119 that overhangs the radially outward-facing surface 2117. The annular cavity 2115 is thereby bounded in a radially inward-facing direction, in a radially outward-facing direction, and in a first axial direction. The annular cavity 2115 is operable to receive the annular wall 2111 from a second axial direction that is opposite to the first axial direction.

Figure 21B:
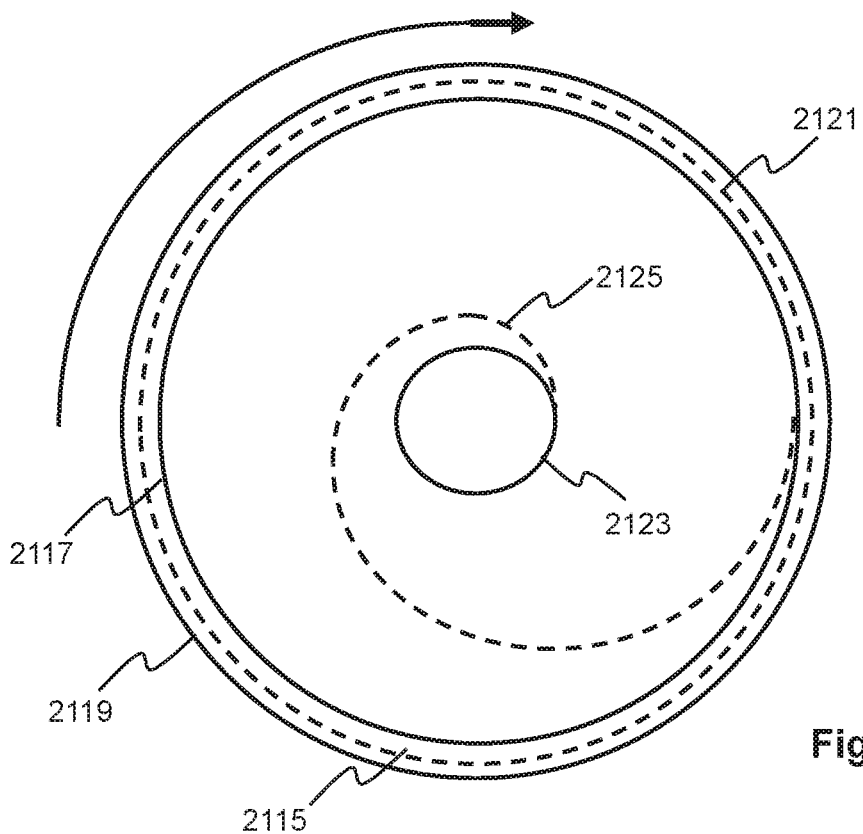

FIG. 21B shows a view from below of the second portion 2105. In this example, the container 2101 is operable to supply printing material to a printing system, and the second portion 2105 has integral structures operable to perform the task of supplying printing material to the printing system. In particular, the second portion comprises a channel structure 2123 defining an opening to the second portion 2105, and a material-guiding structure 2125. Other examples of containers have other integral structures that depend on the purpose of the container.

Figure 21C:
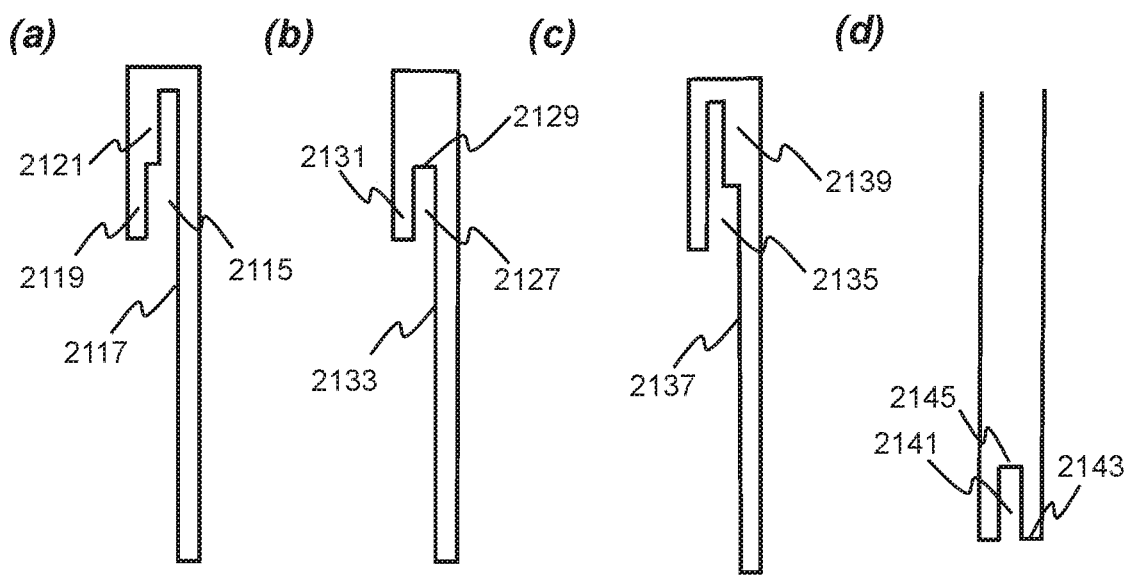

FIG. 21C shows example cross sections of annular cavities for receiving an annular wall. Example (a) shows a cross section of the annular cavity 2115 of the second portion 2105 of FIG. 21A, as viewed from a direction perpendicular to the axis 2109. In this example, the lip 2119 comprises a member 2121 extending into the annular cavity 2115. The member 2121 is a bounding member of the annular cavity 2115, meaning that at least a part of the annular cavity 2115 is bounded in at least one direction by the member 2121. In this example, the member 2121 is annular, having a radially inward-facing surface extending from a radially inward-facing surface of the lip 2119, and a flat lower surface with a normal facing in the axial direction from which the annular cavity 2115 is operable to receive the annular wall 2111. The member 2121 is configured for fusing with an outer surface of the annular wall 2111, as will be described hereafter. A member of a first portion that is configured for fusing with a specific region of a second portion is referred to as an energy director.

Example (b) of FIG. 21C shows a cross section of a different annular cavity 2127 comprised in a container portion for receiving an annular wall. In this example, an axially-facing surface 2129 extends between a radially outward-facing surface 2133 of the container portion and a radially inward-facing surface of a lip 2131 that overhangs the radially outward-facing surface 2133. In this example, the axially-facing surface 2129 is configured for fusing with a top surface of an annular wall. The axially-facing surface 2129 is an example of a bounding member of the annular cavity 2127.

Example (c) of FIG. 21C shows a cross section of a different annular cavity 2135 comprised in a container portion for receiving an annular wall. In this example, a bounding member 2139 of the annular cavity 2135 extends from a radially outward-facing surface 2137 of the container portion. In this example, the bounding member 2139 is configured for fusing with an inner surface of an annular wall.

Example (d) of FIG. 21C shows a cross section of a different annular cavity 2141 comprised in a container portion for receiving an annularwall. In this example, annular cavity 2141 is an indent in an axially-facing surface 2143 of the container portion. In this example, the axially-facing surface 2143 is configured for fusing with a top surface of an annular wall. The axially-facing surface 2143 is an example of a bounding member of the annular cavity 2141.

Each of the examples of FIG. 21C includes an annular bounding member for fusing with an annular wall. Other examples include bounding members that do not have a circular symmetry. For example, a container portion may have several bounding members for fusing with an annular wall, the bounding members being located at regular or irregular angular intervals within an annular cavity.

In the present example, the two portions are joined by advancing the annular wall into the annular cavity, e.g. by applying a compressive force in an axial direction of the opening. The first portion and the second portion are then temporarily rotated relative to each other to fuse the first and second portions. This is described in more detail below.

Figure 21D:
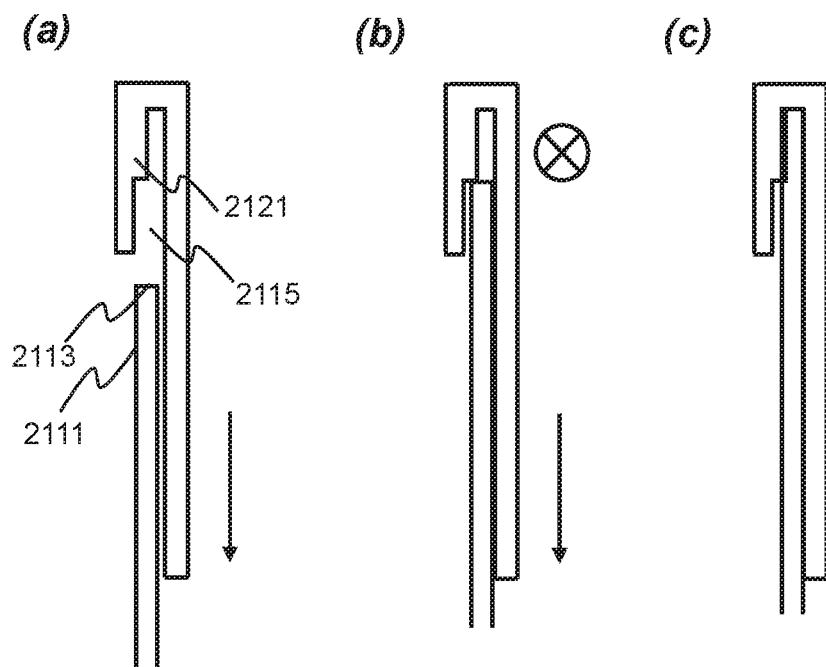
Figure 22:
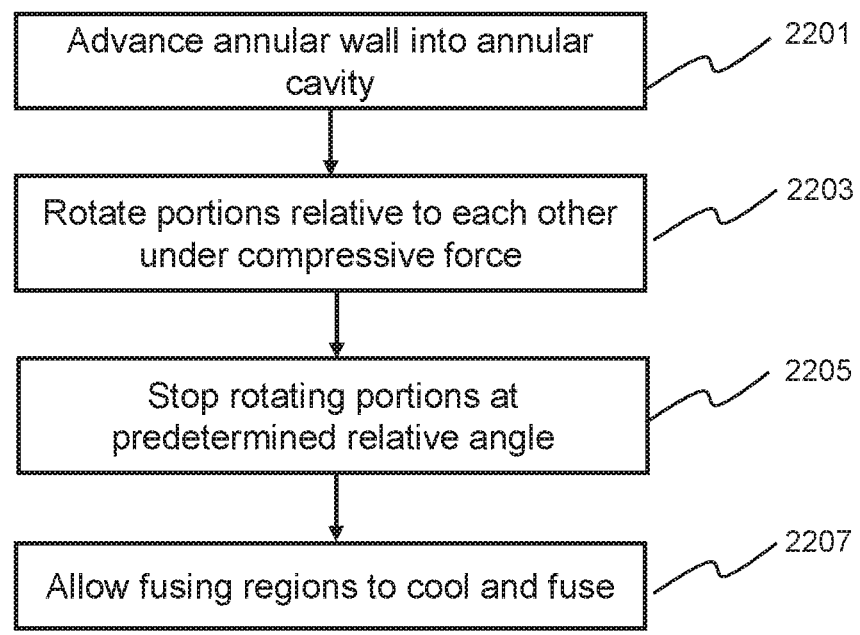
FIG. 22 is a flow chart showing a method of manufacturing a container according to an example.

The flow diagram of FIG. 22 represents a routine by which the first portion 2103 and the second portion 2105 are joined together to form the container 2101. The routine begins by advancing, at 2201, the annular wall 2111 of the first portion 2103 into the annular cavity 2115 of the second portion 2105. In this example, a spin welding machine is used to hold to the first portion 2103 stationary and to advance the second portion 2105 towards the first portion 2103 in an axial direction as shown by the straight arrows in FIG. 21A. As shown in stage (a) of FIG. 21D, the annular wall 2111 is advanced into the annular cavity 2115 as the second portion 2105 is advanced towards the first portion 2103. In other examples, a spin welding machine is used to hold the second portion 2105 stationary and to advance the first portion 2103 towards the second portion 2105 in an axial direction. In further examples, a spin welding machine is used to advance the first portion 2103 and the second portion 2105 towards each other.

The spin welding machine advances the annular wall 2111 into the annular cavity 2115 until the upper surface 2113 of the annular wall 2111 abuts a lower surface of the bounding member 2121, as shown in stage (b) of FIG. 21D. The spin welding machine then continues to exert a compressive force between the first portion 2103 and the second portion 2105 in an axial direction of the opening 2109 of the first portion 2103. In this example, the compressive force does not significantly deform either of the container portions.

The spin welding machine temporarily rotates, at 2203, the first portion 2103 and the second portion 2105 relative to each other under the compressive force. In this example, the spin welding machine holds the first portion 2103 stationary whilst temporarily rotating the second portion 2105. In other examples, a spin welding machine holds the second portion 2105 stationary whilst rotating the first portion 2103. In further examples, a spin welding machine temporarily rotates the first portion 2103 and the second portion 2105 in opposite directions. The spin welding machine temporarily rotates the container portions relative to one another at a rate such that the relative tangential speed of the bounding member 2121 with respect to the annular wall 2111 is sufficiently high to cause the abutting regions of the bounding member 2121 and the annular wall 2111 to increase in temperature due to friction such that they become plastic. The rate of rotation therefore depends on the properties of the thermoplastic material from which the container portions are formed. The rate of rotation also depends on the radius of the annular wall 2111 and accordingly the radius of the annular cavity 2115. In some examples, temporarily rotating a first portion and a second portion relative to each other comprises temporarily rotating the first portion and the second portion at a relative angular velocity of between 100 revolutions per minute and 1000 revolutions per minute. In the example of FIG. 21A, the radius of the annular wall is approximately 10 cm and rotating the first portion 2103 and the second portion 2105 relative to each other comprises rotating the second portion 2105 at a rate of approximately 500 revolutions per minute.

The spin welding machine temporarily rotates the second portion 2105 relative to the first portion 2103. In particular, the spin welding machine rotates the second portion 2105 relative to the first portion 2103 until a sufficient fraction of the bounding member 2121 and the annular wall 2111 have become plastic that the annular wall 2111 is advanced under the compressive force to a maximum axial displacement within the annular cavity 2115, as shown in stage (c) of FIG. 21D. The first material of the first portion 2103 and the second material of the second portion 2105 have substantially equal melting rates, meaning that during the time that the second portion 2105 is rotated relative to the first portion 2103, the regions become plastic at substantially the same rate. The melting rate of a thermoplastic material depends on the melting temperature, as well as the viscosity of the material. The first material of the first portion 2103 and the second material of the second portion 2105 are chosen to have substantially the same melting rate, although the first material and the second material are different materials. This ensures that the bounding member 2121 and the annular wall 2111 become both become plastic along an interface between the bounding member 2121 and the annular wall 2111. As the bounding member 2121 and the annular wall 2111 become plastic, the relative motion of the bounding member 2121 and the annular wall 2111 causes the plastic regions to mix, forming a mixed plastic region, referred to as a fusing region, represented by the shaded region in stage (c) of FIG. 21D.

The configuration of the annular cavity 2115, in which the lip 2119 overhangs the radially outward-facing surface 2117, and the bounding member 2121 extends in a radially inward-facing direction from the lip, prevents plastic material, referred to as weld flash, from entering the interior of the container 2101 as the second portion 2105 is temporarily rotated relative to the first portion 2103. Preventing weld flash from entering a container prevents the weld flash from contaminating the interior volumes of the container. In some examples, the material that the container will be filled with may not be of the same type or form as the weld flash, and in such examples it may not be acceptable for weld flash to enter the container.

The spin welding machine arrests, at 2205, the relative rotation between the first portion 2103 and the second portion 2105 at a predetermined relative angle between the first portion 2103 and the second portion 2105. In this example, the predetermined angle is accurate to within less than one degree. Arresting the relative rotation between the first portion 2103 and the second portion 2105 at a predetermined angle is referred to as clocking. In this example, the first portion 2103 and the second portion 2105 both have integral features, such as the material-guiding structure 2125, and these integral features have an alignment in order for the container to be operable to supply printing material to a printing system. In other examples, such as those for which at least one of the first portion and the second portion have cylindrical symmetry, the relative motion may be arrested at an arbitrary angle.

The spin welding machine arrests the relative rotation between the first portion 2103 and the second portion 2105 substantially instantaneously. This means that the relative rotation is arrested in a time interval that is much shorter than the time taken for the plastic material to cool and fuse. In this example, the relative rotation is decreased from a maximum relative rate of rotation to zero in less than one tenth of a second. Arresting the relative rotation between the first portion 2103 and the second portion 2105 substantially instantaneously causes the plastic material to cool evenly, preventing the formation of particles during the cooling process that may weaken a resulting weld formed between the first portion 2103 and the second portion 2105.

After arresting the relative rotation between the first portion 2103 and the second portion 2105, the spin welding machine holds the first portion 2103 and the second portion 2105 in place and allows, at 2207, the fusing region to cool, thereby fusing and creating a weld between the first portion 2103 and the second portion 2105.

In the example of FIG. 21A, providing the first portion 2103 comprises forming the first portion 2103 by blow molding. Forming the first portion 2103 by blow molding results in the first portion having precisely-controllable outer dimensions and less precisely-controllable inner dimensions. In particular, the radially outward-facing surface of the annular wall 2111 is more precisely cylindrical than the radially inward-facing surface of the annular wall 2111. Therefore, the bounding member 2121 fuses with the more precisely-controlled surface of the annular wall 2111, resulting in a more reliable weld. In other examples, other molding processes are used to form a first portion having an annular wall. Examples of other molding processes that may be used are compression molding, injection molding, and structural foam molding.

In the example of FIG. 21A, providing the second portion 2105 comprises forming the second portion 2105 by injection molding. Forming the second portion 2105 by injection molding results in precisely-controllable dimensions of all of the surfaces of the second portion 2105. In other examples, other molding processes are used to form a second portion having an annular cavity for receiving an annular wall. Examples of other molding processes that may be used are compression molding and structural foam molding.

Due to the respective molding processes used to form the first portion 2103 and the second portion 2105, the first material that substantially forms the first portion 2103 is more viscous than the second material that substantially forms the second portion 2105. For blow molding, a relatively viscous plastic material is used to form a parison into which a gas is blown, causing the exterior surface of the parison to adhere to the inner wall of a mold, before the plastic material cools and solidifies. For injection molding, a less viscous plastic material is injected into a mold such that the plastic material entirely fills the mold, before the plastic cools and solidifies. As discussed above, in the example of FIG. 21A, the melting rates of the first material and the second material, which depend on the viscosity, are chosen to be substantially the same.

As such in certain examples a container for storing a printing material such as a powdered build material is presented that comprises a blow-molded rotatable chamber for storing the powdered build material and an injection-molded base comprising an opening for conveying the printing material between an interior and exterior of the container. In this case, the injection-molded base is mounted within an open end of the blow-molded rotatable chamber and the injection-molded base comprises an annular cavity that receives an annular wall of the blow-molded rotatable chamber, wherein the blow-molded rotatable chamber is fused to the injection-molded base via a spin weld.

Figure 23:
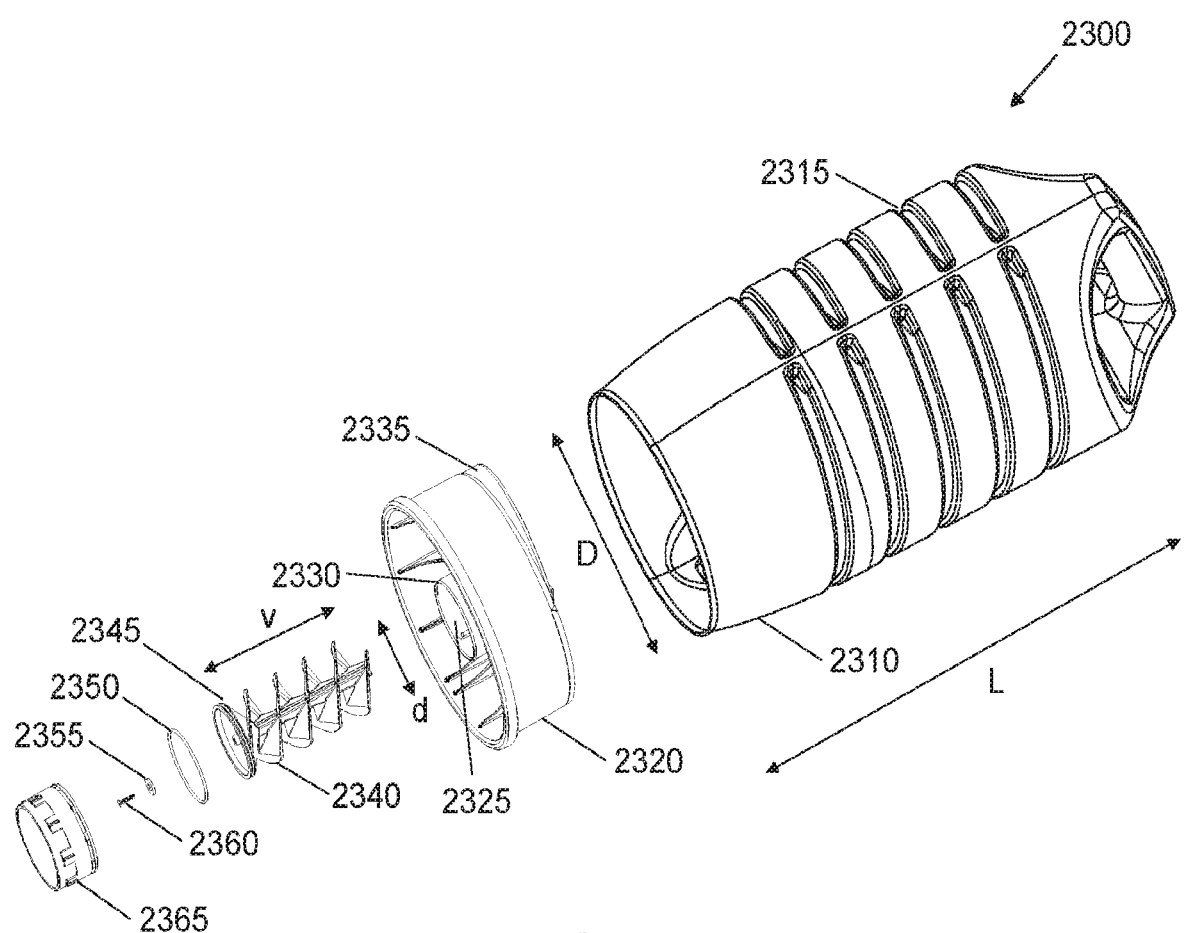
FIG. 23 is an exploded view of a further example container.

FIG. 23 is an exploded isometric view of an example container 2300 that combines certain features described above. The container comprises a generally cylindrical chamber 2310 of diameter D, and length L. The container has internal helical flighting 2315 on the cylindrical walls of height h, and pitch p. The container 2300 in this example has a permanently attached base 2320 with a smaller opening 2325 of diameter d, in the center that is formed within a channel structure 2330 and that is co-axial with the chamber 2310. The channel structure 2330 forms a co-axial spout feature. The base 2320 has a material-guiding structure in the form of an internal Archimedes screw 2335, or spiral feature, that is approximately the internal diameter of the chamber 2310 at the bottom of the base 2320 and that transitions to approximately the diameter of the central opening 2325 at the top of the base 2320, where it forms part of a bottom of the channel structure 2330. Other examples of this screw are shown in FIGS. 12A to 12E. The channel structure 2330 and the spiral feature of the Archimedes screw 2335 have an axial hole of diameter d. D may be in a range of between 150 and 250 mm for a three-dimensional printing example, and L may be in a range of between 400 and 600 mm. The diameter d may be in a range of 45 to 65 mm in the same example.

The container of FIG. 23 also comprises a material-conveying member 2340 in the form of an auger valve or helix screw of diameter d and length v. The length v may be in a range of 100 to 150 mm in an example. The spiral auger feature of the material-conveying member 2340 matches the spiral feature of the Archimedes screw 2335. Further, in the present example, the spiral auger feature of the material-conveying member 2340 mates with and completes the Archimedes screw when it is installed in the opening 2325 to a depth that still allows the material-conveying member 2340 to protrude a distance o, representing the open position. The distance o may be in a range of 20 to 40 mm for a three-dimensional printing example. The material-conveying member 2340 further comprises a valve structure 2345 at its end. An O-ring 2350 for the valve structure is shown in the Figure. When the material-conveying member 2340 is installed to its full depth, the valve structure 2345 forms a seal for the opening 2325. This represents a closed position of the material-conveying member 2340. The material-conveying member 2340 may be keyed to the base 2320, e.g. to prevent relative rotation as described above. The material-conveying member 2340 may comprise integral spring ramps and stops, so that once installed it can then only move between closed and open positions and cannot rotate with respect to the chamber 2310. The material-conveying member 2340 has a washer 2355 and screw 2360 at the end of the member. These may function as the engagement member 918 described with reference to FIGS. 9D and 9E. Lastly a cap 2365 may be screwed onto the channel structure 2330 to seal the container 2300, e.g. as per cap 951 shown in FIGS. 9F and 9G. The cap 2365 may be tamper evident.

During operation, the container 2300 may be filled with fresh printing material, e.g. at a site of filling and/or manufacture, and the material-conveying member 2340 installed. In this example, the keying and other features limit future member movements to a predefined range of axial displacement.

Examples of containers as described herein enable powdered material to be delivered with expected, original properties and flow behaviors. For example, by tumbling at various rotational speeds, powdered material in the container can be mixed under several types of motion regimes, including slumping, rolling, cascading and cataracting. These motion regimes re-aerate and re-mix the powder, reversing the effects of consolidation, compaction and segregation.

The example containers described herein may be used for a wide range of printing materials. For example, they may be used for a wide variety of powder types, where each powder type may have different cohesive properties, compaction behaviors and segregation. In certain examples, a container may further comprise electronic circuitry adapted to electronically communicate a printing material type installed within the container to a printing system. For example, a wired or wireless interface may transmit data loaded into a chip in the container. The container may then be monitored when installed within a printing system and rotated according to a specific routine for the printing material type therein (e.g. a set speed and direction that has been successful at refreshing the properties of the specific material type in the past). Once the material properties are refreshed, the container may have a material-conveying member opened by the printing system, e.g. as shown in FIGS. 9D and 9E, and then be rotated at a speed and direction to dispense the printing material. As long as the rotational speed is lower a speed known to cause centrifuging, and the internal supply surface is not rough or electrostatically charged, a significant portion of the printing material will be dispensed.

As well as providing benefits for printing material supply, the example containers described herein also allow fresh or excess printing material to be efficiently loaded back into the container. Fresh material may be loaded when switching between printing material types. By feeding powder to a material-conveying member while rotating the container in reverse at relatively low rotational speeds, the printing material may be moved into the container by the material-conveying member and then further into the container chamber by the internal raised portions (e.g. the ribs or flighting).

To increase a rate and efficiency of fill, the rotational speed may be increased such that a printing material within the container enters a centrifuging motion regime, where the centrifugal forces on the material particles become larger than gravitational forces. In this case, the printing material may form a tube coating the cylindrical chamber inner walls. Printing material that is introduced by the material-conveying member then moves into the chamber near the rotational axis (where centrifugal forces are smallest) and, once inside, moves towards the outer walls and flows axially to maintain a cylinder shape. In this case, the printing material layer thickens as more material is introduced, and the cylinder of air in the center of the chamber gets smaller and smaller. A rotational speed, in revolutions per minute, to achieve centrifuging may be determined as a speed equal to 42.3 divided by the square root of the inner diameter. If a goal is to remove as much excess powder from the printer as possible, the rotational speed can be increased to cause compaction of the material layer and thus increase the capacity of the removal. If a goal is to remove used printing material for reuse at a later time, or fresh material for a material change, the container can be filled to a normal level, leaving some air volume in the inner chamber, so the printing material can be refreshed by later tumbling. In either case, the material-conveying member may be closed (e.g. by reversing the sequence shown in FIGS. 9D and 9E) by the printing system and released. A user may then be notified by the printing system that they can remove the full container.

Certain examples described herein provide more efficient use of space than comparative gravity feed hopper supplies, e.g. where the feed hopper is fed by pouring printing material into the hopper. Gravity feed hoppers have steep angles to ensure a flow of printing material. In the present examples, printing material may be fed by rotating the container. As the containers may be mounted horizontally, they avoid tall vertical feed systems and hoppers. Certain examples described herein also reduce an effect of compaction by rotating the container, which avoids manual shaking, tipping or tumbling. The containers described in examples herein further provide a simple solution that reduces or avoids the wear and higher complexity of internal augers and/or mixers within the printing system. They also reduce and/or avoid the separation of printing material that may occur with comparative vacuum systems.

Certain examples described herein present a container for a printing material, e.g. in powder form, that may be installed horizontally, rotated to re-mix, re-aerate and refresh the flow properties of the material, and that may deliver the material to a printing system at a controlled rate. In addition, the same container, when coupled to a material supply may be arranged to accept printing material from the printing system when requested, and may be filled to at least 95% of its internal volume while remaining in the horizontal orientation. In certain described examples, the container has a material-conveying member, e.g. in the form of a central auger valve, that opens to move printing material in or out of the container depending on the rotation direction. In certain described examples, a material-guiding structure, e.g. in the form of an Archimedes screw, may be used to move printing material between edges of the container and the axial material-conveying member. In further examples, helical raised portions, e.g. in the form of ribs or a flighting, on the cylindrical walls may be used to move printing material along the direction of the container axis. These features may be supplied individually or in a combination of two or more components, wherein in the latter case they may interact to provide a synergistic effect. The container may be scaled to a variety of sizes, while still retaining the benefits discussed herein.

The preceding description has been presented to illustrate and describe certain examples. Different sets of examples have been described; these may be applied individually or in combination for a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A container comprising:
   a chamber for storing build material for a three-dimensional printing system;
   an opening co-axial with a longitudinal axis of the chamber for coupling to the three-dimensional printing system; and
   a material-conveying member mounted within the chamber and arranged within the opening to guide build material between the chamber and the three-dimensional printing system during rotation, wherein the material-conveying member is a screw; and
   a connecting member between the material-conveying member and the opening to prevent relative motion between the material conveying member and the opening;
   wherein the container is configured such that rotation of the chamber in a first direction about the longitudinal axis of the chamber conveys build material in the chamber to the three-dimensional printing system and rotation of the chamber in a second direction about the longitudinal axis conveys the build material away from the three-dimensional printing system, and
   wherein the container is configured such that, on rotation of the chamber:
   the material-conveying member is rotated in a same direction as the chamber; and
   there is no relative motion between the material-conveying member and the opening.

2. The container of claim 1, wherein the material-conveying member comprises a multi-helix screw.

3. The container of claim 1, wherein the build material is a powdered build material.

4. The container of claim 1, wherein the opening forms part of a base for the container, the base further comprising a material-guiding structure formed around and below the opening to guide build material between the chamber and the material-conveying member during rotation.

5. The container of claim 1, wherein the chamber comprises an inner surface, the inner surface comprising helical raised portions to guide build material between the chamber and the opening when the chamber is rotated.

6. The container of claim 1, comprising a valve structure disposed within the opening, wherein the valve structure is translatable within the opening between a proximal position and a distal position in an axial direction, and is arranged to seal the opening when the valve structure is in the proximal position.

7. The container of claim 1, further comprising a notch in one of the material-conveying member and the opening to interface with a protrusion of the other of the opening and the material-conveying member to prevent relative motion between the material-conveying member and the opening.

8. The container of claim 4, wherein the material-guiding structure comprises a helical lower surface that extends from the opening in an axial direction.

9. The container of claim 8, wherein:
   upon rotation of the chamber in the first direction, the material-guiding structure guides material to the material-conveying member; and
   upon rotation of the chamber in the second direction, the material-guiding structure guides material to the chamber.

10. The container of claim 4, wherein the material-guiding structure is integrated with the base.

11. The container of claim 4, wherein the material-conveying member mates with and completes an Archimedes screw with the material-guiding structure when installed in the opening.

12. The container of claim 11, wherein the Archimedes screw has an internal diameter of the chamber at a bottom of the base and a diameter of the opening at a top of the base.

* * * * *